(12) United States Patent
Lloyd et al.

(10) Patent No.: US 8,023,421 B2
(45) Date of Patent: Sep. 20, 2011

(54) METHOD AND APPARATUS FOR THE ASSESSMENT AND OPTIMIZATION OF NETWORK TRAFFIC

(75) Inventors: Michael A. Lloyd, Belmont, CA (US); Omar C. Baldonado, Palo Alto, CA (US); Sean P. Finn, Belmont, CA (US); Mansour J. Karam, Mountain View, CA (US); James G. McGuire, San Francisco, CA (US); Herbert S. Madan, Tiburon, CA (US)

(73) Assignee: Avaya Inc., Basking Ridge, NJ (US)

( * ) Notice: Subject to any disclaimer, the term of this patent is extended or adjusted under 35 U.S.C. 154(b) by 845 days.

(21) Appl. No.: 11/602,765

(22) Filed: Nov. 20, 2006

(65) Prior Publication Data

US 2007/0064715 A1 Mar. 22, 2007

Related U.S. Application Data

(62) Division of application No. 10/070,515, filed on Jul. 25, 2002, now Pat. No. 7,336,613.

(51) Int. Cl.
*H04J 1/16* (2006.01)
*H04L 1/00* (2006.01)
*H04L 12/26* (2006.01)

(52) U.S. Cl. .................... 370/252; 370/253; 370/254

(58) Field of Classification Search ............... 370/252, 370/248, 241, 241.1, 242, 253, 254; 709/223, 709/224
See application file for complete search history.

(56) References Cited

U.S. PATENT DOCUMENTS

| | | | |
|---|---|---|---|
| 4,284,852 A | 8/1981 | Szbicki et al. | 179/18 |
| 4,345,116 A | 8/1982 | Ash et al. | 179/18 |
| 4,495,570 A | 1/1985 | Kitajima et al. | 364/200 |
| 4,594,704 A | 6/1986 | Ollivier | 370/16 |
| 4,669,113 A | 5/1987 | Ash et al. | 379/221 |
| 4,704,724 A | 11/1987 | Krishnan et al. | 379/221 |
| 4,726,017 A | 2/1988 | Krum et al. | 370/85 |
| 4,748,658 A | 5/1988 | Gopal et al. | 379/221 |
| 4,788,721 A | 11/1988 | Krishnan et al. | 379/221 |
| 4,839,798 A | 6/1989 | Eguchi et al. | 364/200 |
| 4,901,244 A | 2/1990 | Szeto | 364/481 |
| 4,920,432 A | 4/1990 | Eggers et al. | 360/331 |
| 4,931,941 A | 6/1990 | Krishnan | 364/437 |
| 4,939,726 A | 7/1990 | Flammer et al. | 370/94.1 |
| 4,949,187 A | 8/1990 | Cohen | |
| 4,949,248 A | 8/1990 | Caro | 364/200 |

(Continued)

FOREIGN PATENT DOCUMENTS

EP 0504537 9/1992

(Continued)

OTHER PUBLICATIONS

Notice of Allowance for U.S. Appl. No. 10/070,515, mailed Aug. 9, 2007.

(Continued)

*Primary Examiner* — Chuong T Ho
(74) *Attorney, Agent, or Firm* — Sheridan Ross P.C.

(57) ABSTRACT

A system for the assessment of network performance criteria, and applying this criteria to the classification of network addresses into appropriate ranges, using these ranges to consolidate performance measurements for the associated addresses, and applying these metrics toward the optimization of the network towards performance or policy objectives.

34 Claims, 6 Drawing Sheets

U.S. PATENT DOCUMENTS

| | | | |
|---|---|---|---|
| 5,142,570 A | 8/1992 | Chaudhary et al. | 379/221 |
| 5,172,413 A | 12/1992 | Bradley et al. | 380/20 |
| 5,253,341 A | 10/1993 | Rozmanith et al. | 395/200 |
| 5,271,000 A | 12/1993 | Engbersen et al. | |
| 5,287,537 A | 2/1994 | Newmark et al. | 395/800 |
| 5,291,554 A | 3/1994 | Morales | 380/5 |
| 5,341,477 A | 8/1994 | Pitkin et al. | 395/200 |
| 5,343,463 A | 8/1994 | van Tetering et al. | 370/13 |
| 5,361,256 A | 11/1994 | Doeringer et al. | |
| 5,371,532 A | 12/1994 | Gelman et al. | 348/7 |
| 5,375,070 A | 12/1994 | Hershey et al. | 364/550 |
| 5,406,502 A | 4/1995 | Haramaty et al. | 364/551.01 |
| 5,410,343 A | 4/1995 | Coddington et al. | 348/7 |
| 5,414,455 A | 5/1995 | Hooper et al. | 348/7 |
| 5,442,389 A | 8/1995 | Blahut | 348/7 |
| 5,442,390 A | 8/1995 | Hooper et al. | 348/7 |
| 5,442,749 A | 8/1995 | Northcutt et al. | 395/200.09 |
| 5,452,294 A | 9/1995 | Natarajan | 370/54 |
| 5,467,345 A | 11/1995 | Cutler, Jr. et al. | 370/60 |
| 5,471,622 A | 11/1995 | Eadline | 395/650 |
| 5,471,623 A | 11/1995 | Napolitano, Jr. | |
| 5,475,615 A | 12/1995 | Lin | 364/514 |
| 5,477,536 A | 12/1995 | Picard | 370/54 |
| 5,508,732 A | 4/1996 | Bottomley et al. | 348/7 |
| 5,514,938 A | 5/1996 | Zaaijer et al. | |
| 5,515,511 A | 5/1996 | Nguyen et al. | 395/200.2 |
| 5,519,435 A | 5/1996 | Anderson | 348/8 |
| 5,521,591 A | 5/1996 | Arora et al. | 340/826 |
| 5,528,281 A | 6/1996 | Grady et al. | 348/7 |
| 5,535,195 A | 7/1996 | Lee | 370/54 |
| 5,537,394 A | 7/1996 | Abe et al. | 370/17 |
| 5,563,875 A | 10/1996 | Hefel et al. | 370/15 |
| 5,574,938 A | 11/1996 | Bartow et al. | |
| 5,590,126 A | 12/1996 | Mishra et al. | 370/329 |
| 5,629,930 A | 5/1997 | Beshai et al. | 370/396 |
| 5,631,897 A | 5/1997 | Pacheco et al. | 370/237 |
| 5,636,216 A | 6/1997 | Fox et al. | 370/402 |
| 5,652,841 A | 7/1997 | Nemirovsky et al. | 395/201 |
| 5,654,958 A | 8/1997 | Natarajan | 370/410 |
| 5,659,196 A | 8/1997 | Honda | |
| 5,659,796 A | 8/1997 | Thorson et al. | |
| 5,668,800 A | 9/1997 | Stevenson | 370/248 |
| 5,675,741 A | 10/1997 | Aggarwal et al. | 395/200 |
| 5,729,528 A | 3/1998 | Salingre et al. | 370/230 |
| 5,754,547 A | 5/1998 | Nakazawa | |
| 5,754,639 A | 5/1998 | Flockhart et al. | 379/221 |
| 5,787,253 A | 7/1998 | McCreery et al. | 395/200.61 |
| 5,793,976 A | 8/1998 | Chen et al. | 395/200.54 |
| 5,802,106 A | 9/1998 | Packer | 375/225 |
| 5,805,594 A | 9/1998 | Kotchey et al. | 370/401 |
| 5,812,528 A | 9/1998 | Van Dervort | 370/235 |
| 5,826,253 A | 10/1998 | Bredenberg | |
| 5,835,710 A | 11/1998 | Nagami et al. | 395/200.8 |
| 5,841,775 A | 11/1998 | Huang | |
| 5,845,091 A | 12/1998 | Dunne et al. | |
| 5,872,930 A | 2/1999 | Masters et al. | |
| 5,884,047 A | 3/1999 | Aikawa et al. | 395/200.68 |
| 5,892,754 A | 4/1999 | Kompella et al. | 370/236 |
| 5,935,216 A | 8/1999 | Benner et al. | |
| 5,940,478 A | 8/1999 | Vaudreuil et al. | |
| 5,944,779 A | 8/1999 | Blum | |
| 5,974,457 A | 10/1999 | Waclawsky et al. | 709/224 |
| 6,006,264 A | 12/1999 | Colby et al. | 709/226 |
| 6,009,081 A | 12/1999 | Wheeler et al. | 370/255 |
| 6,012,088 A | 1/2000 | Li et al. | |
| 6,026,411 A | 2/2000 | Delp | |
| 6,026,441 A | 2/2000 | Ronen | 709/227 |
| 6,034,946 A | 3/2000 | Roginsky et al. | 370/238 |
| 6,052,718 A | 4/2000 | Gifford | 709/219 |
| 6,064,946 A | 5/2000 | Beerends | 702/57 |
| 6,069,889 A | 5/2000 | Feldman et al. | 370/351 |
| 6,078,953 A | 6/2000 | Vaid et al. | |
| 6,078,963 A | 6/2000 | Civanlar et al. | 709/238 |
| 6,085,238 A | 7/2000 | Yuasa et al. | |
| 6,108,703 A | 8/2000 | Leighton et al. | 709/226 |
| 6,111,881 A | 8/2000 | Soncodi | 370/395 |
| 6,119,235 A | 9/2000 | Vaid et al. | 713/201 |
| 6,130,890 A | 10/2000 | Leinwand et al. | 370/400 |
| 6,134,589 A | 10/2000 | Hultgren | |
| 6,167,052 A | 12/2000 | McNeill et al. | 370/399 |
| 6,167,444 A * | 12/2000 | Boden et al. | 709/223 |
| 6,173,324 B1 | 1/2001 | D'Souza | 709/224 |
| 6,178,448 B1 | 1/2001 | Gray et al. | 709/224 |
| 6,185,598 B1 | 2/2001 | Farber et al. | |
| 6,185,601 B1 | 2/2001 | Wolff | 709/203 |
| 6,189,044 B1 | 2/2001 | Thomson et al. | 709/242 |
| 6,208,713 B1 * | 3/2001 | Rahrer et al. | 379/67.1 |
| 6,226,266 B1 | 5/2001 | Galand et al. | 370/235 |
| 6,275,470 B1 | 8/2001 | Ricciulli | |
| 6,282,562 B1 | 8/2001 | Sidi et al. | 709/105 |
| 6,286,045 B1 | 9/2001 | Griffiths et al. | 709/224 |
| 6,292,832 B1 | 9/2001 | Shah et al. | 709/226 |
| 6,311,144 B1 | 10/2001 | Abu El Ata | 703/2 |
| 6,317,118 B1 | 11/2001 | Yoneno | |
| 6,317,778 B1 | 11/2001 | Dias et al. | |
| 6,317,792 B1 | 11/2001 | Mundy et al. | |
| 6,339,595 B1 | 1/2002 | Rekhter et al. | 370/392 |
| 6,341,309 B1 | 1/2002 | Vaid et al. | 709/223 |
| 6,351,465 B1 | 2/2002 | Han | |
| 6,363,332 B1 | 3/2002 | Rangarajan et al. | 702/185 |
| 6,385,198 B1 | 5/2002 | Ofek et al. | 370/389 |
| 6,385,643 B1 | 5/2002 | Jacobs et al. | |
| 6,393,486 B1 | 5/2002 | Pelavin et al. | |
| 6,415,323 B1 | 7/2002 | McCanne et al. | 709/225 |
| 6,426,955 B1 | 7/2002 | Gossett Dalton, Jr. et al. | 370/401 |
| 6,430,160 B1 | 8/2002 | Smith et al. | |
| 6,434,606 B1 | 8/2002 | Borella et al. | 709/214 |
| 6,438,592 B1 | 8/2002 | Killian | 709/224 |
| 6,446,028 B1 | 9/2002 | Wang | 702/186 |
| 6,452,950 B1 | 9/2002 | Ohlswson et al. | 370/516 |
| 6,453,356 B1 | 9/2002 | Sheard et al. | |
| 6,463,454 B1 | 10/2002 | Lumelsky et al. | 709/105 |
| 6,493,353 B2 | 12/2002 | Kelly et al. | |
| 6,522,627 B1 | 2/2003 | Mauger | 370/230 |
| 6,526,056 B1 | 2/2003 | Rekhter et al. | 370/392 |
| 6,538,416 B1 | 3/2003 | Hahne et al. | |
| 6,549,954 B1 | 4/2003 | Lambrecht et al. | |
| 6,553,423 B1 | 4/2003 | Chen | |
| 6,556,582 B1 | 4/2003 | Redi | |
| 6,560,204 B1 | 5/2003 | Rayes | 370/253 |
| 6,584,093 B1 | 6/2003 | Salama et al. | |
| 6,594,268 B1 * | 7/2003 | Aukia et al. | 370/400 |
| 6,594,307 B1 | 7/2003 | Beerends | 375/224 |
| 6,594,692 B1 | 7/2003 | Reisman | |
| 6,597,684 B1 * | 7/2003 | Gulati et al. | 370/351 |
| 6,601,098 B1 | 7/2003 | Case et al. | 709/224 |
| 6,601,101 B1 | 7/2003 | Lee et al. | |
| 6,608,841 B1 | 8/2003 | Koodli | 370/474 |
| 6,611,872 B1 | 8/2003 | McCanne | |
| 6,614,789 B1 | 9/2003 | Yazdani et al. | 370/392 |
| 6,625,648 B1 | 9/2003 | Schwaller et al. | 709/224 |
| 6,631,419 B1 | 10/2003 | Greene | 709/238 |
| 6,633,640 B1 | 10/2003 | Cohen et al. | 379/265.03 |
| 6,633,878 B1 | 10/2003 | Underwood | |
| 6,658,000 B1 | 12/2003 | Raciborski et al. | |
| 6,661,797 B1 | 12/2003 | Goel et al. | |
| 6,665,271 B1 | 12/2003 | Thomas et al. | |
| 6,665,725 B1 | 12/2003 | Dietz et al. | |
| 6,687,229 B1 | 2/2004 | Kataria et al. | 370/238 |
| 6,704,768 B1 | 3/2004 | Zombek et al. | |
| 6,704,795 B1 | 3/2004 | Fernando et al. | |
| 6,707,824 B1 | 3/2004 | Achilles et al. | 370/412 |
| 6,711,137 B1 | 3/2004 | Klassen et al. | |
| 6,711,152 B1 | 3/2004 | Kalmanek, Jr. et al. | 370/351 |
| 6,714,549 B1 | 3/2004 | Phaltankar | 370/397 |
| 6,714,896 B1 | 3/2004 | Barrett | 702/189 |
| 6,728,484 B1 | 4/2004 | Ghani | |
| 6,728,777 B1 | 4/2004 | Lee et al. | |
| 6,728,779 B1 | 4/2004 | Griffin et al. | 709/239 |
| 6,751,562 B1 | 4/2004 | Lee et al. | |
| 6,735,177 B1 | 5/2004 | Suzuki | 370/238 |
| 6,748,426 B1 | 6/2004 | Shaffer et al. | 709/219 |
| 6,751,661 B1 | 6/2004 | Geddes | |
| 6,751,664 B1 | 6/2004 | Kogan et al. | |
| 6,757,255 B1 | 6/2004 | Aoki et al. | |
| 6,760,775 B1 | 7/2004 | Anerousis et al. | 709/238 |

| | | |
|---|---|---|
| 6,760,777 B1 | 7/2004 | Agarwal et al. ............... 709/238 |
| 6,766,381 B1 | 7/2004 | Barker et al. ................. 709/246 |
| 6,771,646 B1 | 8/2004 | Sarkissian et al. |
| 6,785,704 B1 | 8/2004 | McCanne |
| 6,795,399 B1 | 9/2004 | Benmohamed et al. ....... 370/235 |
| 6,795,860 B1 | 9/2004 | Shah ............................ 709/229 |
| 6,801,502 B1 | 10/2004 | Rexford et al. ............... 370/235 |
| 6,810,417 B2 | 10/2004 | Lee |
| 6,819,662 B1 | 11/2004 | Grover et al. |
| 6,820,133 B1 | 11/2004 | Grove et al. |
| 6,826,613 B1 | 11/2004 | Wang et al. |
| 6,829,221 B1 | 12/2004 | Winckles et al. ............. 370/238 |
| 6,829,654 B1 | 12/2004 | Jungck |
| 6,836,463 B2 | 12/2004 | Garcia-Luna-Aceves et al. ............................ 370/238 |
| 6,839,745 B1 | 1/2005 | Dingari et al. |
| 6,839,751 B1 | 1/2005 | Dietz et al. ................... 709/224 |
| 6,862,618 B1 | 3/2005 | Gray et al. |
| 6,873,600 B1 | 3/2005 | Duffield et al. |
| 6,885,641 B1 | 4/2005 | Chan et al. ................... 370/252 |
| 6,894,991 B2 | 5/2005 | Ayyagari et al. ............. 370/325 |
| 6,909,700 B1 | 6/2005 | Benmohamed et al. ...... 370/255 |
| 6,912,203 B1 | 6/2005 | Jain et al. |
| 6,912,222 B1 | 6/2005 | Wheeler et al. |
| 6,920,134 B2 | 7/2005 | Hameleers et al. |
| 6,956,858 B2 | 10/2005 | Hariguchi et al. |
| 6,963,575 B1 | 11/2005 | Sistanizadeh et al. |
| 6,963,914 B1 | 11/2005 | Breitbart et al. ............. 709/226 |
| 6,973,490 B1 | 12/2005 | Robertson et al. |
| 6,981,055 B1 | 12/2005 | Ahuja et al. ................. 709/238 |
| 6,993,584 B2 | 1/2006 | Border et al. |
| 6,999,432 B2 | 2/2006 | Zhang et al. ................. 370/328 |
| 7,002,917 B1 | 2/2006 | Saleh ........................... 370/238 |
| 7,020,086 B2 | 3/2006 | Juttner et al. ................ 370/238 |
| 7,024,475 B1 | 4/2006 | Abaye et al. ................. 709/224 |
| 7,027,448 B2 | 4/2006 | Feldmann et al. |
| 7,043,541 B1 | 5/2006 | Bechtolsheim et al. |
| 7,043,562 B2 | 5/2006 | Dally et al. |
| 7,046,653 B2 | 5/2006 | Nigrin et al. |
| 7,065,584 B1 | 6/2006 | Shavitt et al. ................ 709/241 |
| 7,080,161 B2 * | 7/2006 | Leddy et al. ................. 709/250 |
| 7,085,230 B2 | 8/2006 | Hardy ........................... 370/232 |
| 7,099,282 B1 | 8/2006 | Hardy ........................... 370/252 |
| 7,107,326 B1 | 9/2006 | Fijolek et al. |
| 7,110,393 B1 | 9/2006 | Tripathi et al. ............... 370/352 |
| 7,111,073 B1 | 9/2006 | Jain et al. ..................... 709/241 |
| 7,123,620 B1 | 10/2006 | Ma ............................ 370/395.32 |
| 7,124,173 B2 | 10/2006 | Moriarty |
| 7,139,242 B2 | 11/2006 | Bays ............................. 370/238 |
| 7,155,436 B2 | 12/2006 | Hegde et al. .................... 707/10 |
| 7,162,539 B2 | 1/2007 | Garcie-Luna-Aceves .... 709/242 |
| 7,222,190 B2 | 5/2007 | Klinker et al. |
| 7,222,268 B2 | 5/2007 | Zaifman et al. |
| 7,269,157 B2 | 9/2007 | Klinker et al. ............... 370/351 |
| 7,336,613 B2 * | 2/2008 | Lloyd et al. .................. 370/237 |
| 7,343,422 B2 | 3/2008 | Garcia-Luna-Aceves et al. |
| 7,349,994 B2 | 3/2008 | Balonado et al. |
| 7,359,955 B2 | 4/2008 | Menon et al. |
| 7,363,367 B2 | 4/2008 | Lloyd et al. |
| 7,406,539 B2 | 7/2008 | Baldonado et al. |
| 7,472,192 B2 | 12/2008 | DeFerranti et al. |
| 7,487,237 B2 | 2/2009 | Lloyd et al. |
| 7,675,868 B2 | 3/2010 | Balonado et al. |
| 7,773,536 B2 * | 8/2010 | Lloyd et al. .................. 370/252 |
| 2001/0010059 A1 | 7/2001 | Burman et al. |
| 2001/0026537 A1 | 10/2001 | Massey |
| 2001/0037311 A1 | 11/2001 | McCoy et al. ................... 705/65 |
| 2002/0038331 A1 | 3/2002 | Flavin ........................... 709/105 |
| 2002/0062388 A1 | 5/2002 | Ogier et al. |
| 2002/0124100 A1 | 9/2002 | Adams .......................... 709/232 |
| 2002/0184527 A1 | 12/2002 | Chun et al. |
| 2003/0016770 A1 | 1/2003 | Trans ............................ 375/346 |
| 2003/0039212 A1 | 2/2003 | Lloyd et al. .................. 370/235 |
| 2003/0112788 A1 | 6/2003 | Erhart et al. .................. 370/345 |
| 2003/0147353 A1 * | 8/2003 | Clarkson et al. ............. 370/252 |
| 2003/0161321 A1 | 8/2003 | Karam et al. |
| 2003/0163555 A1 | 8/2003 | Battou et al. |
| 2003/0202468 A1 | 10/2003 | Cain et al. |
| 2004/0030776 A1 | 2/2004 | Cantrell et al. ............... 709/224 |
| 2004/0062267 A1 | 4/2004 | Minami et al. ................ 370/463 |
| 2004/0218546 A1 | 11/2004 | Clark ............................ 370/252 |
| 2005/0044270 A1 | 2/2005 | Grove et al. .................. 709/238 |
| 2005/0083912 A1 | 4/2005 | Afshar et al. ................. 370/352 |
| 2005/0132060 A1 | 6/2005 | Mo et al. ....................... 709/227 |
| 2005/0185654 A1 | 8/2005 | Zadikian et al. |
| 2005/0201302 A1 | 9/2005 | Gaddis et al. ................. 370/254 |
| 2005/0243726 A1 | 11/2005 | Narendran .................... 370/238 |
| 2006/0026682 A1 | 2/2006 | Zakas ............................. 726/22 |
| 2006/0036763 A1 | 2/2006 | Johnson et al. ............... 709/238 |
| 2006/0072543 A1 | 4/2006 | Lloyd et al. |
| 2006/0291446 A1 | 12/2006 | Caldwell et al. |
| 2007/0115840 A1 | 5/2007 | Feick et al. |
| 2007/0271066 A1 | 11/2007 | Nikitin et al. ................ 702/181 |
| 2008/0089241 A1 | 4/2008 | Lloyd et al. |
| 2008/0101793 A1 | 5/2008 | Koch et al. ...................... 398/1 |
| 2009/0006647 A1 | 1/2009 | Balonado et al. |
| 2009/0031025 A1 | 1/2009 | Lloyd et al. |

FOREIGN PATENT DOCUMENTS

| | | |
|---|---|---|
| EP | 0528075 | 2/1993 |
| EP | 0 788 267 A2 | 8/1997 |
| EP | 0 598 969 B1 | 2/1999 |
| EP | 0926922 | 6/1999 |
| EP | 0 942 560 A2 | 9/1999 |
| EP | 0 982 901 A1 | 1/2000 |
| EP | 0 977 456 A2 | 2/2000 |
| EP | 1035751 | 9/2000 |
| EP | 0 999 674 A1 | 4/2004 |
| FR | 2806862 | 9/2001 |
| JP | 2000/312226 | 11/2000 |
| JP | 2003-258867 | 9/2003 |
| JP | 2004-56787 | 2/2004 |
| WO | WO 94/08415 | 4/1994 |
| WO | WO 99/06913 | 2/1999 |
| WO | WO 99/14907 | 3/1999 |
| WO | WO 99/14931 | 3/1999 |
| WO | WO 99/14932 | 3/1999 |
| WO | WO 99/18751 | 4/1999 |
| WO | WO 99/30460 | 6/1999 |
| WO | WO 99/39481 | 8/1999 |
| WO | WO 00/04458 | 1/2000 |
| WO | WO 00/25224 | 5/2000 |
| WO | WO 00/38381 | 6/2000 |
| WO | WO 00/45560 | 8/2000 |
| WO | WO 00/52906 | 9/2000 |
| WO | WO 00/62489 | 10/2000 |
| WO | WO 00/72528 A1 | 11/2000 |
| WO | WO 00/79362 A2 | 12/2000 |
| WO | WO 00/79730 A2 | 12/2000 |
| WO | WO 01/06717 A1 | 1/2001 |
| WO | WO 01/13585 A1 | 2/2001 |
| WO | WO 02/23807 | 3/2002 |
| WO | WO 02/33892 | 4/2002 |
| WO | WO 02/33893 | 4/2002 |
| WO | WO 02/33894 | 4/2002 |
| WO | WO 02/33896 A3 | 4/2002 |
| WO | WO 02/33915 | 4/2002 |
| WO | WO 02/33916 | 4/2002 |
| WO | WO 03/084134 | 10/2003 |

OTHER PUBLICATIONS

Official Action for U.S. Appl. No. 10/070,515, mailed Feb. 8, 2007.
"Internet Protocol", arevelo.com website, as early as available at http://www.arvelo.net/net-bay-ip.html, printed on Aug. 27, 2008, pp. 1-26.
Feamster, et al., "Controlling the Impact of BGP Policy Changes on IP Traffic", as early as Sep. 21, 2004, available at http://nms.lcs.mit.edu/~feamster/talks/bgp/nanog25/talk.pdf, printed on Apr. 28, 2009, pp. 1-25.
Feldmann, "Deriving Traffic Demands for Operational IP Networks: Methodology and Experience", IEEE/ACM Transactions on Networking, Jun. 2001, vol. 9, No. 3, pp. 1-15.
Govindan, et al., "Heuristics for Internet Map Discovery", USC/Information Sciences Institute, 2000, available at http://citeseerx.ist.psu.edu/viewdoc/summary?doi=10.1.1.46.1484, printed Apr. 29, 2009, pp. 1-11.

Jones, "Developing Shared Ontologies in Multi-agent Systems", Department of Computer Science, University of Liverpool. U.K., 1998, available at http://citeseerx.ist.psu.edu/viewdoc/summary?doi=10.1.1.51.148, printed Apr. 29, 2009, pp. 1-10.

Kobayashi, et al. "A Longest Prefix Match Search Engine for Multi-Gigabit IP Processing", IEEE, 2000, p. 1360-1364.

Massoulié, et al., "Arguments in favour of admission control for TCP flows", Microsoft Research, 1999, available at http://citeseerx.ist.psu.edu/viewdoc/summary?doi=10.1.1.43.9121, printed Apr. 29, 2009, pp. 1-12.

Papadopoulos, et al., "Protection and Routing Algorithms for Network Management. The Case of Transmission Networks", Microprocessing and Microprogramming, Sep. 1993, vol. 38, No. s 1-5, pp. 163-17.

Saito, et al., Manageability, Availability, and Performance in Porcupine: A Highly Scalable, Cluster-based mail Service, 1999, available at http://delivery.acm.org/10.1145/360000/354875/p298-saito.pdf?key1=354875&key2=8449590421&coll=GUIDE&dl=GUIDE&CFID=32432225&CFTOKEN=36521928, printed Apr. 28, 2009, pp. 1-35.

Savage, et al., "Practical Network Support for IP Traceback", SIGCOMM, 2000, available at http://www-cse.ucsd.edu/~savage/papers/Sigcomm00.pdf, pp. 1-12.

Skarmeas, et al., "Content based routing as the basis for intra-agent communication", 1999, available at http://citeseerx.ist.psu.edu/viewdoc/summary?doi=10.1.1.56.7760, printed Apr. 28, 2009, pp. 1-18.

Skarmeas, et al., "Intelligent Routing based on Active Patterns as the basis for the integration of distributed information systems", Department of Computing Imperial College London, Feb. 1997, available at http://citeseerx.ist.psu.edu/viewdoc/summary?doi=10.1.1.47.2530, printed Apr. 29, 2009, pp. 1-12.

Yu, "Scalable Routing Design Principles", CoSine Communications, Network Working Group, Request for comments 2791, available at http://www.isi.edu/in-notes/rfc2791.txt, Jul. 2000, printed Apr. 28, 2009, pp. 1-25.

Official Action for Canadian Application No. 2,424,680, dated Apr. 7, 2008.

Official Action for Israel Application No. 155,356 (with partial English translation), dated Sep. 13, 2007.

Official Action for Israel Application No. 155,356 (with partial English translation), dated Oct. 28, 2007.

Official Action for European Application No. 01979856, dated Oct. 10, 2006.

Official Action for European Application No. 01979856, dated Mar. 2, 2007.

Official Action for European Application No. 07002502, dated Dec. 30, 2008.

Extended European Search Report for European Application No. 07002502, dated May 29, 2008.

Background of the invention for the above captioned application (previously provided).

S. Berson et al., "An Architecture for Advance Reservations in the Internet," USC Information Sciences Institute, Jul. 16, 1998, pp. 1-21.

R.P. Draves et al., " Constructing Optimal IP Routing Tables", 1999 IEEE, 1-10.

R. Govindan et al., "An Analysis of Internet Inter-Domain Topology and Route Stability," USC Information Sciences Institute, 1997 IEEE, 8 pages.

V. Paxson, "Toward a Framework for Defining Internet Performance Metrics," http://www.isoc.org/inet96/proceedings/d3/d3_3.htm, pp. 1-20.

C. Alaettinoglu et al. "Routing Policy Specification Language (RPSL)," http://quimby.gnus.org/internet-drafts/draft-ietf-rps-rpsl-v2-00.txt,pp. 1-56.

P. Traina, "BGP-4 Protocol Analysis," Mar. 1995, pp. 1-10.

B. Krishnamurthy et al., "On Network-Aware Clustering of Web Clients," pp. 1-14.

Sami Iren et al., "The Transport Layer: Tutorial and Survey", XP-002210446, ACM Computing Surveys, vol. 31, No. 4, Dec. 1999, pp. 360-405.

D.B. Ingham et al., "Supporting Highly Manageable Web Services", Computer Networks and ISDN Systems 29 (1997), pp. 1405-1416.

Z. Wang et al., "Resource Allocation for Elastic Traffic: Architecture and Mechanisms", Conference Porceedings Article, 2000, XP010376681, pp. 159-169.

Paul Francis et al., "An Architecture for a Global Internet Host Distance Estimation Service", pp. 1-17.

T. Bates et al., "Multiprotocol Extensions for BGP-4", XP-002190777, Jun. 2000, pp. 1-10.

S. Kumar et al., "The MASC/BGMP Architecture for Inter-domain Multicast Routing", pp. 1-12.

D. New, "RFC 3620, The Tunnel Profile," Oct. 2003, The Internet Society.

Murthy, Shree, et al, "A loop-free routing protocol for large-scale internets using distance vectors,"Mar. 14, 2007, pp. 147-161, Computer Communications.

Official Action for U.S. Appl. No. 11/998,678, mailed May 29, 2009.

Bouloutas, A. et al, "Some Graph Partitioning Problems and Algorithms Related to Routing in Large Computer Networks," International Conference on Distributed Computing Systems, Newport Beach, Jun. 5-9, 1989, pp. 362-370, Washington, IEEE Comp. Soc. Press, US.

Yositsugu, Ohmae et al, "Dividing Method for Topological Design of Corporate Communication Networks," Aug. 1, 1992, pp. 54-62, Communications, Wiley Hoboken, NJ, US.

Francis, Paul, et ai, "An Architecture for a Global Internet Host Distance Estimation Service," 1999, pp. 210-217, IEEE.

Notice of Allowance for U.S. Appl. No. 11/998,678, mailed Oct. 2, 2009.

Official Action for Canadian Patent Application No. 2,637,743, mailed Mar. 24, 2010.

Alaettinoglu et al., "Routing Policy Specification Language (RPSL)," (Internet—Draft), http://quimby.gnus.org/internet-drafts/draft-ietf-rps-rpsl-v2-03.txt, pp. 1-68, Apr. 6, 1999.

Official Action for Canada Patent Application No. 2,637,743, mailed Nov. 23, 2010.

Official Action for European Patent Application No. 01979856.0, mailed Oct. 22, 2010.

Official Action for Canada Patent Application No. 2,637,743, mailed Feb. 16, 2011 3 pages.

* cited by examiner

METHOD AND APPARATUS FOR THE ASSESSMENT AND OPTIMIZATION OF NETWORK TRAFFIC

RELATED APPLICATION

This patent application is a divisional of U.S. patent application Ser. No. 10/070,515, filed Jul. 25, 2002, now U.S. Pat. No. 7,336,613 entitled "METHOD AND APPARATUS FOR ASSESSMENT AND OPTIMIZATION OF NETWORK TRAFFIC," which is hereby incorporated by reference.

BACKGROUND OF INVENTION

1. Field of the Invention

This invention relates to the field of networking. In particular, this invention relates to the optimization of network traffic.

2. Description of the Related Art

The performance of packet-based networks (such as the Internet) is typically constrained by the various path-selection processes in place.

Manually configured forwarding tables are not flexible enough to compensate for variations in network performance. In addition, this approach represents a significant impact on scarce skilled resources.

Dynamic Routing Protocols are used to control the vast majority of forwarding decisions on large packet-based networks. These protocols are fairly adaptable to routing failures, but do not effectively compensate for variations in network performance.

Assessment and Optimization of network traffic is also subjective: performance characteristics toward a given destination vary based on the location from which measurements are made. Each locale must identify their own local performance characteristics.

As the number of valid destination addresses increase, the feasibility of measuring performance characteristics toward all destinations in a persistent and ongoing manner decreases to nil.

Consolidating the set of all individual destination addresses into sets. or ranges of addresses significantly reduces the number of tests that must be made in a given time interval. However, in many cases, even this optimization is insufficient: the current Internet routing tables include over 100,000 different "routes", or address range identifiers.

The performance aspects of network paths to any given address will often have similar characteristics of the network paths to a nearby address. However, the task of identifying address blocks which are acceptably similar in performance characteristic is subtle: network address ranges are typically not directly representative of the underlying network topology.

In most locations, the set of actively used address ranges is a relatively small percentage of the total address ranges available. This set of "active" routes is dynamic, and while technology does exist that can identify the set of active flows, in general these systems are constrained by both significant delays in reporting activity, as well as lack of integration into path selection systems.

Most network routing protocols in production use in the Internet are based on relatively primitive topological metrics such as "hop count" or "link costs". Network performance metrics can include a wide variety of units and scales, which typically do not conveniently map to appropriate routing metrics.

SUMMARY OF THE INVENTION

A method and an apparatus for the optimization of internetwork traffic, including the selection of flows for optimization, quantifying appropriate network performance characteristics of these flows, calculating a performance metric from these characteristics, and updating routing or forwarding tables based on this performance metric.

A method and an apparatus for the optimization of internetwork traffic, including the selection of flows for optimization, quantifying appropriate network performance characteristics of these flows, calculating a performance metric from these characteristics, and updating a name resolution system based on this performance metric.

A method and an apparatus for the optimization of internetwork traffic, including the selection of flows for optimization, quantifying appropriate network performance characteristics of these flows, calculating a performance metric from these characteristics, and redirecting traffic flows based on this performance metric.

A method of classifying network addresses into appropriate Groups, based on evaluation of a selection of performance, policy, topology, and related criteria. Having defined said Groups, instantiate them in a server or other networking device, such that performance scores for observed traffic can be consolidated within the Group definition.

Additional features and benefits of the present invention will become apparent from the detailed description. figures and claims set forth below.

DETAILED DESCRIPTION

Figure 1:
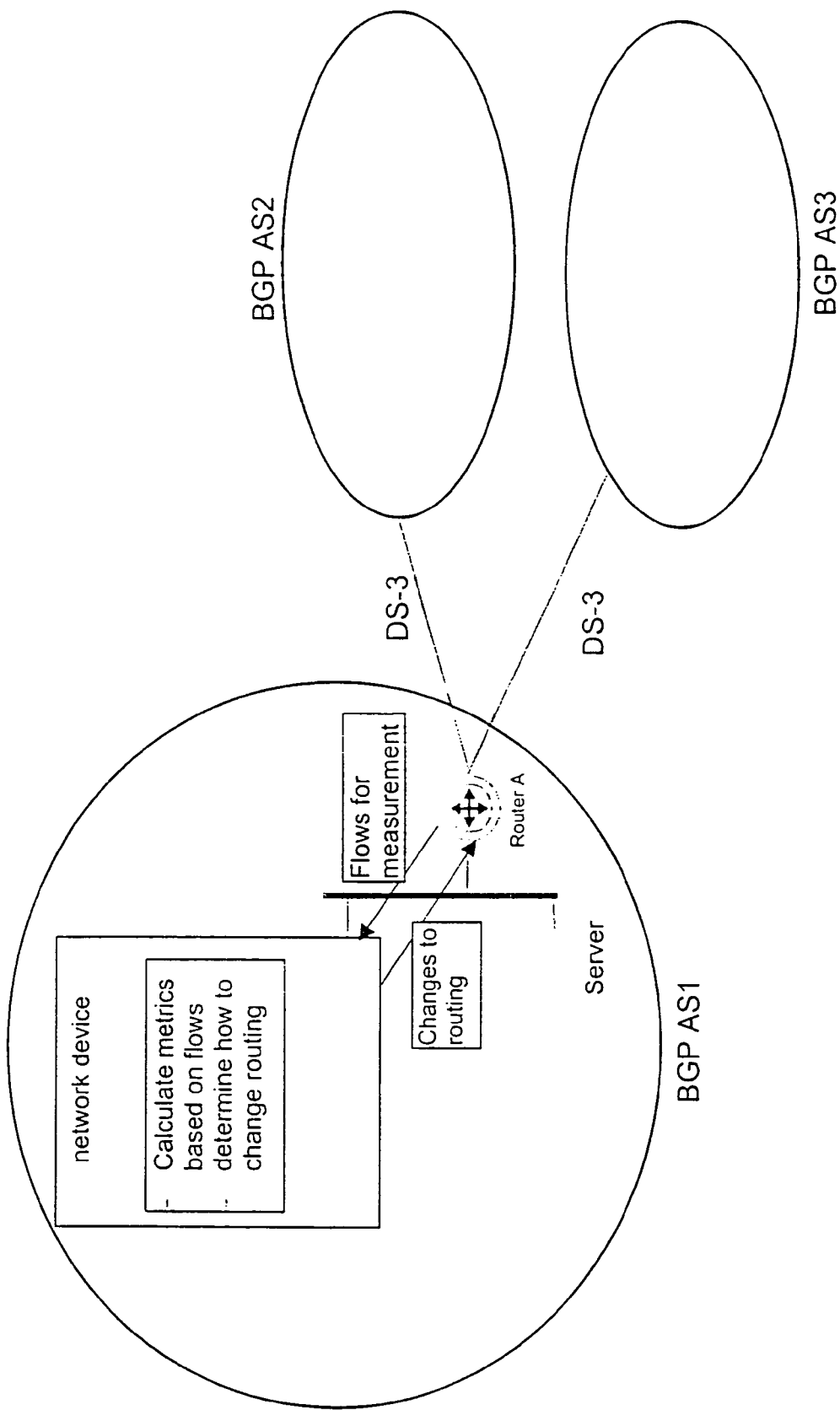
FIG. 1 shows an embodiment of a high-level overview of a specific embodiment of a network device deployed in an internetwork that is measuring performance characteristics of a subset of flows, calculating metrics based on those measurements, and changing the routing. Examples of how to change the routing include using a dynamic routing protocol (either an EGP like BGP or an IGP like OSPF) or reconfiguring the router, e.g., using route maps or static route statements. Note that the network device can be inside an existing router.

In this document, we describe mechanisms that can be used to collect performance information regarding a set of flows, and re-route these flows appropriately. The flows may be between points within a single administrative domain, or at least one of the end points may be in some other domain. The mechanisms described here assume that it is desirable to observe the performance characteristics of the various paths over which it is possible to route the flows. This can occur in the case of organizations making use of network fabric they do not directly control; this includes the exchange of information with a remote end point across the Internet, or the exchange of information between end points belonging to a single organization over fabric owned and operated by a different organization (a Service Provider, or SP). These examples do not limit the application of the invention.

This invention includes mechanisms that implement some combination of the following parts:
1. Determine which flows need to be monitored
2. Collect performance information about these flows
3. Divert traffic, if necessary, by way of Edge Routers connected to multiple Service Providers
4. Route the traffic optimally to the end point
   a. Choose an egress PoP where traffic can be forwarded
      i. Definition of Equivalence Classes
      ii. Centralized management of ECs
      iii. PoP to EC Monitoring
      iv. Winner PoP determination
   b. Choose the best service provider to reach this PoP
      i. Monitoring
   c. Two-tier routing versus Dogleg (combo) routing
      i. Routing Information Communication Protocol: BGP
      ii. Choice of measures, and metric construction
5. Optimized Routing in the forward direction These mechanisms can be implemented in many ways; examples include a single device that implements all of the required functionality. Other examples include a number of different devices, each being responsible for one or more functions. These devices can be located in the network of the domain that generates the traffic which we intend to measure (in this document, we call this domain the Content Provider—CP). Typically, such devices will be located in the CP's DMZ; alternatively, these mechanisms can be implemented in a Colocation Facility (CoLo). Each location is characterized by a different set of requirements. For example, in a CoLo, direct connections can be made between the collection devices and the border routers to which connect the organization whose traffic we measure. We describe implementation examples that correspond to both these environments.

In the context of one specific embodiment of this invention, we describe the hardware needed to collect measurements and bend traffic appropriately. Whether the mechanisms are implemented at a DMZ or Colo, the existing network infrastructure in which these mechanisms are being implemented can either be an autonomous system, or an autonomous subsystem.

In all of the text below, a Surfer merely denotes any IP endpoint that we do not control, and to which we need to develop routes on demand.

Monitoring Exit Traffic

In this embodiment of the invention, a passive monitoring and reporting device is needed, either in the enterprise DMZ or in a collocation facility (CoLo) rack; let's call this device the Collector. The job of the collector is to maintain simple state on selected flows emerging from the CP, and report statistics on them. In some embodiments of this invention, there is an Ethernet link to instrument, in which case packet splitters can be used; to such a device a computer that runs the Collector software can be attached. The softer are needs to receive signals about addresses (and possibly ports) for which to monitor flows.

In some embodiments, the Collector will track sequence numbers (looking for repeats, which can indicate packet loss) and SYNACK to ACK time (as an estimate of edge-to-end RTT). It is then able to report these numbers, or track thresholds and report violations.

In some embodiments, a flow-based data collector (such as RMON II or NetFlow) can be used to identify the flows to be monitored; such a device can also be used to get performance characteristics of the flows.

In some embodiments of this invention, the device can select flows on the basis of input other than performance, such as user input, or the cost of the link. That is, the user can specify the flows that need special treatement. Also, interface statistics can be obtained from network; using this input, quantities such as available bandwidth, cost of usasge of the links, or link bandwidth can be computed. Those skilled in the art can identify other metrics based on which flow determination and treatement can be based. Flows can be diverted when a given threshold in such metrics (such as cost or available bandwidth) is detected.

In some embodiments, some of all of the techniques above can be combined to yield a metric that determines whether a flow should receive special treatement.

In some embodiments of this invention, the set of flows can be provided by an external agent. In some embodiments, this external agent can be human; in other embodiments, these flows can be provided by the external agent according to some criteria.

In some embodiments, the criteria for flow selection can be based on the monitoring of a routing table.

In some embodiments, the device will select flows whose destination network addresses correspond to some selected ranges of network addresses in the table.

In some embodiments, the selected ranges of network addresses can correspond to those flows that are of highest importance to the customer.

In some embodiments, the criteria for flow importance can be the rate of incoming requests.

In other embodiments, the criteria for flow importance can be the revenue that is generated as a result of the activity of the flow. can readily be altered by the Bender to achieve the desired effect, step (d) can be present or omitted.

In some embodiments of this invention, all flows monitored by the collector can be sent to the bender. In other embodiments. only a sub-set of these flows can be monitored. All techniques used above for the determination of which flows to monitor can be used to determine which flows need to be re-routed.

In some embodiments of this invention, this mechanism includes a network device (for example, some kind of a router), under control from some processing unit (a computer) that runs the appropriate software. In one embodiment, the computer is responsible for (a) through (c), and then communicates with the router to make (d) and (e) happen appropriately. In one embodiment, a human can intervene on the router to effect stages (d) and (e), on the basis of reports or signals generated by the computer performing steps (a) through (c). Those skilled in the art will readily identify different packaging schemes for this invention. In this embodiment of the invention, we assume that a given flow is identified by its destination IP address; those skilled in the art can identify other ways to identify flows. When the CP wants to signal that traffic towards a particular IP address needs to be optimized (see below), it should communicate directly with the Bender. The Bender can communicate about qualified flows with the border routers that connect to the different available service provider links. It may be necessary for the external fabric to notify the Bender of a flow, depending on the CP's particular choice of signaling method (e.g., an API, through, for instance, HTTP requests.)

The Bender will inform the Collector that a particular flow is qualified. and the Collector will begin to monitor the flow. The Collector returns statistics to the Bender. In some embodiments of this invention, these statistics may encompass more flows than are strictly qualified; indeed, it is possible to infer performance problems in non-qualified flows, and use these proactively. The Bender will then implement logic that determines whether the qualified flow needs to be diverted. In a simplified embodiment of this invention, all qualified flows can be diverted to the Bender. This would significantly simplify the function of the Collector.

The Content Provider's Choice of Flows

A number of possible methods can be used by the Content Provider to inform the collector that a flow is qualified for optimization. Various embodiments have one or more options for the Content Provider, including:
1. No notification—all active sessions are qualified Surfer addresses
2. Static pre-configuration of qualified addresses
3. URL adjustment, where a Web Surfer will attempt to access the next page via a special address. and we use that as the signal that they are qualified
4. Web page embedding, where the Surfer will download a graphic or other special object, and the access is taken as the qualification signal
5. Calling specialized code within the CP's Server applications which communicates the address to the Bender
6. Calling a specialized method on one of the Bender devices
7. A remote call, in the form of an HTML post operation.

Those skilled in the art can identify other methods used by the Content Provider to inform the Collector that a flow is qualified. Some embodiments implement Option 7. A simple web interface is offered as part of the Bender. Additional logic will take care of performing post operations on the web transactions. A secure web form interface can also be offered as part of other Options for flow qualification; this allows the Content Provider to either experiment with the service, or intervene to control it once it is running. In a simplified embodiment of this invention, the HTML post interface supports one operation, namely to deem one IP address a qualified address for a specified period of time. This period of time is specified by the Content Provider, which enters for this purpose a TTL (Time To Live) for the qualification; it may be desirable to keep the TTL value small; it may also be desirable to provide a default, possibly at around 5 minutes.

In another embodiment of this invention, a more complex interface can be built, that includes the ability to withdraw qualification, and/or to specify additional parameters such as port numbers, relative priority versus other qualified flows, and/oror a general statement of QoS requirements.

Deciding to Divert

In this embodiment of the invention, the Collector sits in the flow of packets, but is strictly passive, and can be built in such a way that even power failure does not compromise the monitored network fabric. (Line splitters and Switch span ports are two examples.) In some embodiments of the invention, the Bender sits out of the normal flow direction, and so must attract any qualified flows.

In some embodiments of the invention, forcing a qualified flow to cross the Bender requires a routing protocol between the Bender and the nearest Content Provider routers. An implementation involves the injection of /32 routes (or an aggregation thereof) for all qualified flows that need to be bent. In some embodiments of this invention, precaution can be taken to withdraw or age out individual advertisements, to avoid the excessive growth of routine tables in the Content Provider routers. One implementation is to have the processing unit cause the router to advertise the qualified destination: one way of implementing this effect is to have the processing unit reconfigure the router (e.g., via telnet) to add a static route. The router may be previously configured to redistribute such statics into the agreed routing protocol running between the Content Provider's edge routers. Many routing protocols can be used in this context. It may be preferable not to be in the normal IGP of the Content Provider, so as to minimize the distance the potentially rapidly changing routes propagate. In some embodiments of this invention, a common protocol with rapid convergence properties (e.g., OSPF) is ideal.

Adding the static route and advertising it will cause the qualified flow to divert to the Bender (after a route convergence time). In case the IP address is used to determine qualified traffic, and if this IP address is shared between qualified and non-qualified traffic, unqualified traffic may also be included (e.g., because of Port Address Translation—PAT). In other embodiments of this invention, qualified and unqualified flows within a single IP address can be separated.

Forwarding Qualified Flows Through Optimized Service Provider Routes

Once a flow has been diverted, it can be forwarded through an optimized route.

The static used to divert the flow is the first piece of tunable routing. In some embodiments of the invention, the router component of the Bender has connectivity to edge routers which are in turn connected to various service provider links, to which qualified traffic will be sent. (In this document, we will refer to this set of routers and links at the edge of the domain as a point of presence—PoP.) In this document, we focus on an implementation that assumes the existence of GRE tunnels between any connected PoPs. Those skilled in the art can identify other implementations that do not involve the use of GRE tunnels; for example, connected sites may have IPSec fabric between them, or no tunneling mechanism at all. In the case of GRE, static routes used to divert traffic can point directly into one (or more than one) of these GRE tunnels, based on a decision process in the processing unit of the Bender.

Recursive Static Routing

In other embodiments of this invention, another layer of indirection can be added; one such implementation involves the use of statics to remote IP next hops. The idea is to decouple the static that bends the traffic towards specialized devices from the details of how it is to be forwarded. Such recursive statics provide a useful simplification for minor performance cost.

The specific implementation details of these recursive static routes can depend on whether the Bender devices are inside the Content Provider's DMZ, or in a neighboring CoLo rack. In the first case, it is sometimes desirable not to move a full feed of performance data in to the Bender, which could prevent the implementation of complex edge-to-edge routing decisions. When in a CoLo facility, the Bending devices are presumably fully connected to the PoPs, rendering the implementation of full routing decisions to be an easier task (as described below under routing for core PoPs).

In the DMZ case, some embodiments of this invention involve having a process that adds static routes to the router (in addition to those static routes advertised to divert the flows to the Bender, described above). These processes may involve the addition of several specific statics, with next hops that spread across the GRE tunnels leading to various PoPs. In some embodiments of the invention, this indirection is outside the GRE tunnels themselves, hence preserving the property that a single flow will all go to the same next PoP, even if load sharing across tunnels per flow is in use.

In a CoLo example, the process for selecting nearby PoPs is, in some embodiments of this invention, unnecessary, and the initial statistics used to attract flows can simply point to the core-facing router in the PoP. The core-facing router will already have selected a high-performance route to the Surfer, as described below.

The Core Fabric for Optimized Routing

Whether the interface with the Content Provider is within their DMZ, or out in a CoLo, packets will eventually arrive at a PoP connected to a core Internet fabric, where routing optimization can take place. In some embodiments of the invention, the problem can be decomposed into three pieces:
1. Choosing one or more candidate egress PoPs, and
2. Choosing routes to those PoPs.
3. Implementing routes to these PoPs In general, Choices 1 and 2 are not orthogonal decisions, since the egress can depend on the cross-core performance. In some embodiments, methods for steps 3 can include automatic changes to an IGP, to BGP, or manual changes to either. In some embodiments, these changes are in the form of router configurations that statically alter the routing of flows (methods including use of route maps and/or use of static route statements). In other embodiments, changes are in the form of router configurations that adjust the processing of dynamic routing updates. In some other embodiments, changes to routing are determined within the forwarding device, and are applied directly to its routing table.

Choosing One or More Candidate Egress PoPs

When routing towards general Surfer addresses, it is, in general, undesirable to sustain individual routes to every Surfer address, since this can cause significant growth of Internet routing tables. Hence, in some embodiments of this invention, the implementation is constrained to be designed for scale. In general, many neighboring hosts can be routed in the same way. However, in some other cases, load sharing may be used, so it will not be the case that any two flows to the same subnet will follow the same actual path across the core.

Address "Equivalence Classes" (or "Group") Definition and Applications

Some embodiments of this invention use the notion of "Equivalence Classes" (ECs), also known as "Groups". An "EC", or "Group" is a set of network addresses which are to be treated equally by the system for the purposes of performance reporting, and/or performance optimization.

The set of network addresses within a group may include any combination of individual network addresses, and ranges of contiguous network addresses. In some embodiments of this invention, the network addresses in question will be Internet Protocol (IP) addresses. In this case, the traditional "a.b.c.d/m" notation for Internet routes can be used, facilitating communication with conventional Internet routers.

The assessment of a set of network addresses to identify appropriate Group membership requires the identification of appropriate criteria of each network address to evaluate.

In general, address classification criteria falls in four (4) distinct classes of attributes:
1. Performance-related
2. Administrative Policy
3. Topological Proximity
4. Pre-Existing Set Definitions Performance-related criteria include those parameters which may be observed of traffic to and/or from an address or address range. Examples of such parameters include: delay, jitter, loss, retransmission, and network load. These parameters may be observed as a result of active measurement (transmission of test traffic); or passive measurement (observation of existing flows).

The range of Administrative Policy criteria encompasses a range of considerations that may, or may not be directly observable within the network fabric itself. Examples include:

Cost Considerations: a specific address range, or set of address ranges, may benefit from reduced costs from a specific provider. Examples of this case include directly negotiated "Private Peering" agreements.

Address Aggregation Policy: In some cases, scalability consderations of individual networking devices, and the system as a whole, result in desires to limit the number of address ranges to be managed. It order to keep the number of address ranges reasonable, defining "minimum set criteria" for address ranges is sometimes required. Examples of this case include "minimum set size of 255 addresses", which is to say, addresses, and address ranges involving less than 255 addresses, will be aggregated into a single set. In some cases. Address Aggregation policy varies across the range of managed addresses. For convenience in identifying sets, Address Aggregation policy often is limited to ranges of contiguous addresses.

Administritative Policy may also encompass user-definable criteria.

Topological Proximity criteria allows network addresses which are either topologically contiguous/adjacent, or topologically dependant, to be considered in the definition of Groups. Topological Proximity can be empirically observed through active testing of the network fabric, or inspection of appropriate network documentation. In addition. Topological Proximity can in some cases be inferred from the relative contiguousnous of addresses.

Pre-Existing Address Range definitions may be usefull in the Group definition process: the use of such definitions, if available, may increase the efficiency of bootstrapping the system, and may also allow the system to integrated more effectively with internal or external routing or forwarding devices. In some cases, Pre-Existing Address Range Definitions may map directly (1:1) to Groups; in other cases, a Group may include more than one of the existing Address Definitions. In some examples of this case, a source of routing table information may be identified as the reference source of Group Definition information. In some emodiments of this invention, Group Definitions are kept synchronized with a dynamic Reference Routing Table.

In some embodiments of this invention, it may be desirable to restrict candidate Reference Routing Table entries to be considered for Group membership to contiguous address blocks.

In some embodiments of this invention, combining discontiguous entries in the Reference Routing Table into a single Group membership is acceptable.

Those skilled in the art can identify other metrics which may be considered in the definitions of Groups.

In some embodiments, some or all of the attributes above can be combined into a composite metric to be used for group membership evaluation. Individual network addresses, or network address ranges are evaluated in the context of the selected criteria, and placed in a Group based on this evaluation.

In some embodiments, the definition of groups may at least partially computed with the help of a "clustering" algorithm, which includes one or more of the classification criteria described above.

Updates

Assignment of network addresses, and network address ranges, into appropriate Groups may need to be reviewed and repeated based on changing network conditions including advertised address ranges, network performance characteristics, and user-defined policies. This process manually initiated, or it may be triggered by the detection of changes in network conditions; or may be scheduled to occur on a regular basis.

Central vs. Distributed Definition of Group Membership

In some cases, it may be important for all PoPs to agree on the specific definitions of each Group. In addition, the computation required for flexibly adjusting the Group sizes is both CPU and data intensive. Consequently, in some embodiments of this invention, the management of the Group list is centralized. One implementation involves:

1. A central server
2. A data warehouse for historic performance data
4. A communication system that can inform all PoPs of changes in Equivalence Classes as they are found.

One implementation involves allowing the centralized Group manager to determine which PoP advertises a new Group Definition first, based on its complete information base. This implementation will allow PoPs to coordinate, and will hence prevent them going out of sync.

In other embodiments of this invention, Group Management and definitions can be independent in different POPs. That is, the actions of creation, modification, and deletion of the groups are performed at sites distributed across the different PoPs. One simple implementation of such an embodiment can involve a PoP advertising to all other peers in the network whenever it makes changes to the EC list (that is, upon the creation, modification, and deletion of a group or a set of groups).

Specific embodiments of this invention will differ in the details of their Group Definitions, depending on the range of IP addresses that are deemed "equivalent".

Application of Groups to Routing Tables

In some embodiments of this invention, it may be desirable to enfore a direct 1:1 mapping between Group Definition and a Reference Routing Table.

In some embodiments of this invention, the Reference Routing Table may be obtained from within the local Autonomous System.

In some embodiments of this invention, the Reference Routing Table may be obtained from outside the local Autonomous System.

In some embodiments of this invention, it may be desirable to allow Groups to refer to exactly one or more entries of the Reference Routing Table.

In some embodiments of this invention, it may be desirable to allow Groups to refer to one or of the entries in the Reference Routing Table, in addition to one or more individual addresses, each of which may, or may not, be explicitly included in the Reference Routing Table.

In some embodiments of this invention, it may be desirable to allow Groups to refer to address ranges which were are not present in the Reference Routing Table. In some cases, this may involve address ranges within Group definitions which are broader than those currenly present in the reference routing table.

In some embodiments of this invention, it may be appropriate to constrain the address ranges in Group definitions such that they refer to ranges which are no larger than the existing entries in the Reference Routing Table.

Monitoring Equivalence Classes in Possible Egress PoPs

Given the set of Equivalence Classes into which the Internet is divided, this section describes how each Equivalence Class is routed. As a first part of this process, in embodiments of this invention, PoPs measure their distances to an EC via various external routes; that is, if PoP A had packets heading to EC B, and it chose to drop those packets out to the Internet, how well would they perform?

Embodiments of this invention can implement one or more of the following monitoring options:

1. A direct attempt to ping the Surfer address.
2. Traceroute towards the Surfer.
3. Coercing the Surfer to communicate with a PoP as part of the conversation, for example by embedding a particular GIF as part of their Web page. (Telnet or other protocols could also be used.)
4. Asking the Surfer to run some code that initiates connections to candidate PoPs. (The motivation for the Surfer would be the improved performance if they were to do this. Note also that only one or a few Surfers within an EC need to accept the code to get a measurement for the whole EC.)
5. Passive monitoring of the flow, either within the Ingress PoP or elsewhere. (Note that in some implementations the Ingress PoP will need to be able to cope with only seeing unidirectional communication, since we cannot always guarantee that return packets will go via the same PoP.)
6. The simple observation of the Surfer's routed choice of Ingress into the Optimized Routing Infrastructure. (Clearly, this and the passive monitoring approach require that the forward flow actually impinge upon the core fabric.)
7. An estimate of geographic distance to the Surfer, in some embodiments obtained from databases which correlate Internet addresses with locations
8. The regular BGP answer for distance to an address range. Note that this has the useful property of always generating an answer if no other basis can be found. (This will require a little adjustment once our EC's no longer match existing BGP routes, but the task is not too difficult.)

Those skilled in the art will identify other monitoring techniques.

In some embodiments of this invention, it may be desirable to ensure the results of these tests are comparable between PoPs.

The implementation described in this document includes a PoP assessing its "distance" to a given EC autonomously along every Egress connection it has to the Internet, and to summarize the result as a simple metric for communication to other PoPs. That is, in this particular implementation, other PoPs are not fed individual data points or estimates of network quantities such as delay. In some embodiments, this detailed data for each individual Surfer address is fed to the centralized EC Manager, since it is the basis under which EC's can be separated or joined. However, this exchange is distinct from PoP to PoP communication, since routing does not need the fine details; a simple summary of a PoP's "goodness" for a given EC is all that is required.

In some embodiments, measurements can be boiled down into a single statistic. In some cases, it may be important to rank the measurements by their expected quality. In one example implementation, the quality order is:

1. Direct ping measurements to the Surfer
2. Spoofing races; that is, a technique where multiple PoPs respond to a query, all using the same address ("spoofing"). For some common network protocols (including at least DNS, HTTP and TCP), when the answer to the query is used, it is possible to tell which PoP's answer arrived first, and hence is the closest.

3. Observed Ingress PoP
4. Passive monitoring at Ingress PoP
5. Traceroute
6. BGP Given this hierarchy of expected quality, a metric can be constructed, that can be propagated in existing protocols by "concatenating" the measurements; that is, separate measurements can occupy different bits counting from the MSB in an integral metric value. This particular example implementation does not require that the concatenation be strict; overlap of values is allowed, since there is no need to reconstruct precise and separate estimates when these measures are received. In this implementation and other embodiments, the goal is to find those PoPs that are better than others, which are preferred. Some embodiments can consider this property to hold even if the measurements are heterogeneous in method or time.

In the implementation described in this document, low resolution in the metric may be considered acceptable, since this tends to diminish the likelihood of reacting to small changes in performance. The goal of some embodiments is to find several routes, none of which are appreciably sub-optimal, and any one of which can be pulled out of service rapidly (with the others taking over) when sudden performance degradations such as packet drop storms are observed. In those embodiments, paths whose measurements vary by insignificant amounts are treated as equal; in some implementations, this can be achieved with a composite metric of low granularity.

When to Monitor

In some embodiments, it may not be feasible for all PoPs to monitor all EC's across all exit paths at all times. For such embodiments, a decision scheme is needed to trigger the previously described statistics. A few selection techniques can be combined, including at least the following:

1. When a new Surfer address is observed in the PoP (no matter what role the PoP has, since any PoP can choose to abandon packets to un-optimized forwarding), its EC is measured (preferably using the Surfer's actual address in applicable tests)
2. BGP metrics indicate the EC should be "close"
3. Random sampling Those skilled in the art will identify other such techniques.

In some cases, combining all of these techniques can still generate too much test traffic. Hence, in some embodiments, weighted sampling can be implemented; in one such implementation. EC's would be ranked by their priority for testing, and tests would concentrate on the top few at any given moment. In this implementation, initial weighting can be derived from BGP: observation of a flow crossing the PoP causes a large increase in priority (and a record is made of the individual address within the EC). In different embodiments, the weighting can either be cumulative (so that repeat flows from a given EC increase the testing focus applied) or old observations eventually time out.

In other embodiments, more sophisticated feedback can also be added to the EC weighting scheme, using, for example, the data a PoP receives from other PoPs. In one such implementation, a PoP that has at least one measurement for a given EC, compares that measurement to those coming from other PoPs; if its own measurement appears to be close, then it intensifies monitoring; if it is far from optimal by a large margin, then the EC drops far down the priority list. In some embodiments, the EC Manager can suggest EC's for a PoP to monitor, based on the warehoused performance data it is analyzing.

Core PoP to PoP Monitoring

In this case both end points of a cross-core links are under our control.

In some embodiments, it is desirable to generate cross-core measurements that are comparable with the Egress PoP measurements described above, so that path comparisons can be made. In some embodiments of this invention, an overlay network can constitute the network infrastructure that links these PoPs to each other. In the following implementation, we assume the use of GRE tunnels across POPs. In some embodiments, this overlay network can be set up as a single Autonomous System. In this implementation, the overlay network is set up to be single BGP Autonomous system. On the core, different quantities of interest along all direct paths between all PoPs can be directly monitored. Possible measurements cover, and are not restricted to one or more of the following:

1. One-way delay
2. One-way packet drop rate
3. One-way jitter
4. Available access bandwidth. (In some embodiments, this quantity can be estimated via the output buffer fullness on the physical interface at the sending end of the inter-PoP tunnel.)
5. Complete tunnel failure Other embodiments can use two-way measurements instead of one-way measurements. These two-way measurements could include, but are not restricted to delay and packet drop. Those skilled in the art can identify measurement tools readily available for this purpose. In some embodiments, one-way measurements require clock synchronization between end-points: in some embodiments. GPS feeds can be used in the various PoPs. In other embodiments, an NTP clock feed of sufficient quality can be obtained into each PoP.

In some implementations, it could prove beneficial to arrange these results in a low-resolution metric, where effectively similar choices come out with identical numbers. In other instances, the measurement precision will be required to accurately measure the effect on end-user application performance. (Different application measures differ in their significance to end-user application performance; also, various applications are relatively dependent on some quantities, but insensitive to others. For instance, web traffic is immune to jitter until it is severe enough to cause packet reordering, but is very sensitive to packet drops. Conversely, voice and video are relatively tolerant of packet drops, but are extremely sensitive to jitter.)

In some embodiments of this invention, the routing fabric is split with different types of traffic (e.g., jitter sensitive and drop-sensitive types of traffic) utilizing separately optimized routes. One implementation signals which method of handling is best for a given application through the ToS bits in the IP header. In this implementation, the CP, or a process at the CP's site could mark a special ToS value indicating the optimization required for the flow. In some embodiments, the ToS bits can be set flow by flow, using, for example specific knowledge of how the CP can separate application traffic (by port number, IP address, egress point, farm location, etc). However, it may frequently be the case that a CP will only have one class of traffic to put into the routing fabric, so in some embodiments, a constant marking rule can be applied. In all these cases, the traffic can be placed into the right routing system based on the CP-marked sensitivity type, using for this purpose a relatively straightforward use of Policy Based Routing (PBR) at the first PoP.

In other embodiments, the measures of different network parameters (e.g., jitter and loss) are mixed. In such an implementation, the mixture of different measures could hunt for physically short paths that are under-utilized (due to inefficiencies in conventional routing); a relatively under-used route shows improvements for both drop-sensitive and jitter-sensitive traffic. This architecture is viable since experience has shown that high jitter and high loss can be highly correlated phenomena. (That is, the various network degradations are frequently correlated. Real observations show that the correlation is not ironclad, but appears to be present.) For example, voice flows are known not to be particularly sensitive to drops, yet they are sensitive to many of the network conditions which induce drops.)

One other item regarding the metrics deals with their ordering. In some embodiments, Jitter and Delay can be merged. Many implementations exist, the details of which can be found in [CORE-STATS]. (* HERE *)
In such implementations, the proposed order for components of the metric becomes:
1. Packet drops
2. Delay+Jitter
3. Bandwidth In some embodiments, Failure can be omitted, because it does not cause a metric change, but forces a rapid route removal instead.) In some embodiments, each remote PoP generates only a single metric value from the measurements, even though several direct paths are measured. In some embodiments, a numbers across paths could he combined. In this document, we described an implementation for which the metric from the single best path will be used.

Combining these measures with the Egress metric is discussed in the next section.

In simplified embodiments of this invention, cross-core routing and choice of Egress PoP (using EC measurements) can be done independently. In such embodiments, PoPs are based on their proximity to the Surfer, not on their optimality when the flow is at another given point in the network. In other implementations, cross-core routing and choice of Egress PoP can be combined within the same routing infrastructure.
Propagating Route Decisions Between PoPs Now that the performance of various PoPs to an EC, and the PoP-to-PoP characteristics have been measured, a system for communicating these findings between PoPs is needed, so that routing decisions can be made. In some embodiments of this invention, BGP can be used. Indeed, BGP is a communications protocol that is known to be capable of carrying the size of load such an infrastructure would generate; it also provides a number of useful features into one package (publicly available specs, modifiable source code for Unix implementations, and support for "third party" next hops).

In one such implementation, each PoP will be equipped with an implementation of BGP. These BGP sessions should communicate with each other; in some implementations, all PoPs can peer in a full mesh of IBGP peerings. In other implementations where the number of PoPs is large so that a full mesh becomes impractical, BGP Route Reflection can be implemented. In such an infrastructure, each PoP can advertise routes to all EC's that it has monitored, giving an address within that PoP as the next hop. Most attributes in that BGP message can be left at default values; in some implementations, only the 32-bit Local Preference field is modified as to communicate the measurements described above for the closeness of the PoP to the EC. Those skilled in the art can identify other fields that can be used for this purpose (e.g., weight, MED, etc.) In implementations that use Local Preference, desirable routes should have higher values; in some embodiments, a scheme based on an ideal number of points from which "demerits" are subtracted, for example when packets are observed to drop, or delay crosses a series of thresholds, can be implemented. In embodiments using BGP, the BGP process will also receive routes from all other PoPs describing their performance as an Egress for some EC's. In implementations of these embodiments that combine cross-core and edge routing measures, the receiving process can modify an incoming route, adding to the Local Preference a value measuring the cross-core distance from the sending PoP. However, in embodiments where both routing processes act independently (as described above), Egress PoPs can be chosen purely for their good performance towards a Surfer, regardless of cross-core performance.

In such implementations that use BGP, the computer can learn over time about possible Egress PoPs for each EC, and conventional BGP cost comparison can efficiently sort through for one or several winners. In some implementations of BGP, ties will force tie breaking. In other implementations, multiple PoPs deemed "optimal" simultaneously could share load, which will have the advantage of adding redundancy, useful in the event of sudden degradations.

In some embodiments, where the rate of routing updates is large, throttles can be added. One specific implementation could avoid unnecessary advertisements of minor changes in route metrics. One such method is to fail to report changes where an underlying measurement has changed by less than a given percentage of the original measurement (e.g., 5, 10, or 20%).

In some embodiments, the BGP updates can be sent directly across the core fabric. In other embodiments, this data can be moved out of the way of real user traffic (since it may be bursty, and will certainly increase congestion in the most active PoPs). In some such implementations, a relatively low-bandwidth communication infrastructure can be used to allow all PoPs to communicate. Such implementations can use a full meshing across peers. Other implementations can use a hub and spoke pattern into the EC Management site.

In case high resilience is needed, backup routes over the Internet can be designed. That is, for periods when the EC Management site is unreachable, routing traffic can be mixed with user flows.
The Master BGP Local Preference Metric The BGP Local Preference Metric must contain information about Egress PoP selection. In some implementations, it does not deal with specifics of any given path towards the Egress PoP, or any exit interface from that PoP. As previously described, the metric needs to factor in one or more of the following metrics: Packet Drops, Delay+Jitter and Bandwidth. In some embodiments, the metric needs to support an addition operation, so that a summary cost can be made to combine the Egress PoP cost to get to the EC with one or more PoP-to-PoP paths. Also, the use of BGP Local Pref forces semantics where high numbers are better—that is, a route gets a "goodness" score, and as the path gets longer or less good, the score must decrease.

In some embodiments, bandwidth is not explicitly signaled between PoPs. (Given the details of tunnel selection (discussed later), it is non-trivial to interpret a Bandwidth measure directly. Also, the quantity may vary widely even when the network is behaving well, since we can only measure Bandwidth remaining on the links in and out of our PoPs, not along the tunnels themselves, and loading on these links will fluctuate, while Packet Drops. Delay and Jitter may prove relatively stable much of the time.)

In some embodiments, bandwidth consumption can be used as an early warning sign, indicating the onset of link saturation and packet drops. A PoP has a number of options at or near link saturation. Choices include, but are not restricted to:

1. Re-enable a disabled tunnel leading to the remote PoP, which uses a different (unsaturated) link. This link could presumably involve degradation in average performance, or else it would already be in use, but the degradation may be deemed mild compared to the needed gain in bandwidth.
2. Utilize a tunnel leading to a different PoP, again over a different physical link, so that the other PoP can forward more effectively towards the chosen Egress PoP.
3. Send the packets out to the Internet over the locally best exit peering, which is not suffering saturation (presuming the packets are bound for the Surfer, not the Content Provider).
4. Use an "escape hatch", being a peering to an ISP over which no tunnels are constructed. Such escape routes may not be present in an implementation, but if the overall system has any routing problems such as delayed convergence, looping, or hysteresis, this may prove a cost-effective means of controlling adverse conditions.

Those skilled in the art can identify other such choices. In some embodiments, it is necessary to proactively assess degradation, in which case such predictions are made directly by the local PoP and factored in to the advertised scores.

In some embodiments of this invention, the performance-based, application-specific metric derived above could be modified using other variables such as overall network usage, individual network link usage (absolute or relative) or link usage cost. For example, interface stats of network devices (e.g., netflow on routers) could be used to determine current load on all available links, from which an estimate of the cost can be computed. The performance-based metric can then be penalized to take into account cost factors. In some embodiments of this invention, these cost parameters can be manually entered/tuned by the user. In particular, in some embodiments, the user can explicitely penalize or favor given routes.

Enforcing Two-Tier Routing

In this section, we describe a class of implementations of this invention, where cross-core routing, and choice of egress PoP are treated independently. (We refer to such an implementation as Two-Tier Routing.)

Once the BGP process at a given PoP has learned how to route a given EC, it next needs to enforce that choice on the routers in the traffic flow. In this implementation, BGP is used for this purpose: that is, the computer feeds in the routes via IBGP (implying that the router is a Route Reflector Client of the computer), preserving the next hop address that comes from the remote Egress PoP.

The router now has to forward a packet to a remote IP next hop; in this situation, it will perform route recursion, allowing load sharing and resilience. In some embodiments, the BGP communication allows PoPs to decide which other PoPs to use. In other embodiments, a more local process can be inserted to offer the best path towards the selected PoP. Recursion inherits the load sharing behavior of routers, where flows can be split over multiple routes, but always with 1/n of the flows going to each route. In some cases, a 1/n scheme is a viable initial offering. In other embodiments, differential weighting can be required, in which case it is possible to duplicate the router mechanisms to allow moderate diversion from 1/n. In one specific implementation of this idea, multiple similar routes can be inserted to point to the same tunnel. Those skilled in the art can identify other ways of implementing differential weighting.

The process of injecting specific static routes towards remote PoPs derives its decisions from the same PoP-to-PoP measurement previously described. Since all paths were probed to generate the simple cross-core metric, these detailed measurements can inform the choice of tunnel after BGP has selected the egress PoP. In the implementation described here, the BGP process that monitors inter-PoP tunnels can keep track of which tunnels are optimal, and whenever changes occur, can reconfigure static routes on the router in the packet flow to reflect the new information. These static routes have destinations to match the BGP next hop fields (the addresses provided originally by the remote PoPs in their advertisements). The statics' own next hops point directly to GRE tunnels, which offer transit to the far PoP. In some implementations, the reconfiguration of the statics can be done by a human on the basis of reports generated by a monitoring process at the PoPs.

In summary, routing towards the Surfer using this class of implementations of two-tier routing includes one or more of:
   Performance monitoring of EC's from candidate Egress PoPs
   Performance monitoring of PoP-to-PoP GRE tunnels
   Combination of these values and PoP-to-PoP route computation within BGP processes in each PoP
   Insertion of the BGP routes into the forwarding router
   A lower layer of static routes, given to the forwarding router by a local process, which has final authority about how a packet should reach the selected far PoP Using Dogleg Paths (Combo Routing)

In this section, we describe a class of implementations of this invention, where cross-core routing and choice of egress PoP are combined in the same routing infrastructure. (We refer to such an implementation as Combo Routing.) Some embodiments of this invention, described in this section, have the ability to route between PoPs without restriction to direct tunnels. In some embodiments, this is achieved within the lower level static routes, which determine the actual forwarding decision to Bag's chosen Egress PoP. In some implementations of such embodiments, the system that is monitoring the direct paths to other PoPs is extended to generate a moderate amount of test traffic down alternate paths. In some embodiments, it is excessive to ping via every possible path, so another weighted random technique can be used; in one such implementation, testing can be limited to a fixed ration of samples per minute. weighted heavily to the historically best performing alternate routes, but occasionally sampling poor or unknown performers in search of significant changes.

In some embodiments, statics will be added that appear to route to an Egress PoP, but in fact follow a tunnel to an intermediary, in such embodiments, the intermediary PoP can follow its own local routing decision to forward the packets. If no additional loop suppression mechanism is used, such an implementation could conceivably develop loops; indeed, since the various PoPs are deliberately set up to make autonomous decisions, it is possible for the sender and the intermediary to disagree about the correct Egress PoP. In most cases, this is not a problem, but in rare cases a routing loop might develop. In environments where the desire to keep the probability of generating loops as low as possible, some embodiments of this invention can use loop suppression algorithms. An implementation of such a loop suppression technique includes the following: the technique is to disallow dogleg paths of more than three PoPs in the core. In such an implementation, the intermediary PoP must know that the packet has already been sent off the direct path once, and it must limit its choices to direct paths to the Egress. Similarly, the Egress PoP must know that the packet has followed a dogleg, and it must therefore release the packet to the Internet (or deliver it directly without visiting another core PoP).

In some embodiments, the necessary communication can be achieved by creating "floating" GRE tunnels in addition to the existing direct PoP-to-PoP tunnels. In a given PoP, there will be several tunnels leading directly across the fabric to any particular remote PoP; at least one extra tunnel is declared, to a special address in the remote PoP.

In some embodiments, when probing shows that a candidate way to a remote PoP goes via an intermediary, static should be inserted to temporarily force the floating GRE tunnel between the sender PoP and the remote PoP into a direct path to the intermediary. In such embodiments, the choice should be specific; the next hop used for the BGP routes cannot be used, because this can reintroduce loops. Each PoP can be pre-configured with routes that direct anything from the special subnet for a PoP to the direct links to that PoP. In this way, the sender PoP can establish a tunnel to the remote PoP that is coerced to cross precisely one other selected Intermediary PoP.

In such embodiments, the selection of the direct paths between sender and intermediary, and between intermediary and remote, can be simplified to statics that load share across all tunnels. In some embodiments, the router removes any statics to paths that have no connectivity; in other embodiments, they can make use of the dynamic performance information we are already collecting for optimal choice of these statics.

Flows in the Forward Direction

In this final section, we describe one aspect of this invention, which involves the control of flows from the Surfer (i.e., as defined above, a client with an address) to the content provider. (That is, in the forward direction). In some embodiments, diverting the forward flow is an application-specific problem. Web traffic is relatively amenable to forward diversion. In non-Web cases, especially for non-TCP protocols, forward diversion involves, in some embodiments, a special case analysis. In some embodiments, specific non-Web applications will be identified and optimized separately. In some embodiments, the applications of interest can be altered as to make forward flow diversion easier. The general model proposed involves a specialized device that proxies for the application in question. In some embodiments, this proxy can be established on the fly. In other embodiments, this proxy will need manual configuration.

In this section, we describe a method for Web applications: this method involves altering the DNS name embedded in the URL the Surfer is accessing. In some embodiments, this alteration can be made computationally or statically by the Content Provider, based on the logged in identity of the Surfer. The DNS name should be modified on the left In general, the Content Provider will normally own the authoritative DNS server for foo.com. In some embodiments, the Content Provider will insert a referral record for the subdomain "optimized" that has been added. The referral will point to a specialized DNS server, which, in some embodiments, resides in the Bender, and, in other embodiments, resides in a CoLo. In some embodiments, the flexibility to return the normal answer can be exercised; this could be appropriate in case a usage-based SLA has been signed with the CP, and they have reached their limit on how much traffic they can optimize.

In other embodiments, the forward flow can be bended, so as to simplify the selection of return traffic to accept into the optimized routing fabric. In such embodiments, the Bender may no longer need to advertise a /32 to the Content Provider for flows of interest; instead, all to-be-optimized flows can be forced back to the Bender, and no extra flows will be delivered (a potential occurrence with /32 advertisement). For Web traffic at least, the volume of forward flows is substantially less than the returns (most anecdotal measurements imply a 1:6 to 1:8 ratio in volume); hence, in such embodiments, all forward top-be-optimized flows could be accepted without undue threat to the capacity of the core infrastructure.

In some embodiments, the commitment to send the forward traffic across the optimized routing fabric does not carry a reverse requirement; in some implementations, so long as the Bender or CoLo rack can immediately arrange a packet which the Internet can return to the Surfer, and the Surfer can accept as valid, then the freedom can be kept to only take those return flows where a route with better performance exists.

In the implementation described above, the Web-based approach can involve advertising a DNS response to qualified surfers (potentially selected by the Content Provider); this response is a special address, so that the Surfer sends its forward packets in via one of the PoPs. In some embodiments, this address can route all the way through to the Bender location across the optimized routing fabric (using the optimized PoP to PoP routes described earlier).

At the Bender, different implementations exist, depending, for example, on the constraints of the Content Provider. In some embodiments, a combination of destination NAT (as commonly implemented in load balancing products) to forward the packet to the CP's Server, and source NAT (as commonly implemented in firewall products, as well as IOS) can be used to ensure the response packets will return to the Bender. In some implementations, this will anonymize the traffic (the Content Provider no longer sees the original source address)

In other embodiments, the Content Provider will add a secondary address to their Server (or Server farm, represented by a Load Balancer's VIP address), and a method to route packets from the Bender to that isolated special address. In this case, no NAT is required. In some embodiments, a return to the original Bender formulation with /32 advertisements will be needed. The advantage of such an implementation includes the enhanced ability of the Bender to identify properly qualified traffic; anything incorrectly passing through the Bender will not have the right source address from the Server.

In some embodiments, where there is a concern about unauthorized access to the Optimized Routing Fabric, this URL/DNS-based technique techniques can be added to protect from such occurrences. In some embodiments, such techniques involve the Content Provider to notify that a Surfer is qualified (using the forward bending technique described above). Those skilled in the art will identify other such techniques. In some embodiments, when this technique is used in addition to the independent return flow mechanism described at length here, the Content Provider could explicitly identify the qualified addresses and, in some embodiments, their "Time To Live" (TTL) value. In some embodiments, this technique can be combined with DNS redirection, in such a way that flows can be checked as they arrives at the Bender. In some embodiments, in case bottleneck avoidance needs to be enhanced, a flow can be permitted by default, but asynchronously looked up in the currently qualified list. In such an implementation, a flow that proves to be unqualified can be simply redirect. In some embodiments, in case the abuse can be proven to be intentional, a TCP RST can be forced into the stream to punish the Surfer. In some embodiments, given the asymmetry of Web traffic, disqualified forward traffic can be simply tolerated, and a negative rule can be added to the Bender's decision process on which flow to take over the optimized routing fabric. (In such an implementation, the unauthorized user can get no benefit on return traffic.) In other embodiments, the forward traffic can be pushed off the optimized routing fabric. The technique could require, in some implementations, the intervention from the Content Provider, who could flag the address to those surfers, and potentially ask them to use HTML redirection to guide the Surfer back to the usual non-optimized Internet.

Figure 2:
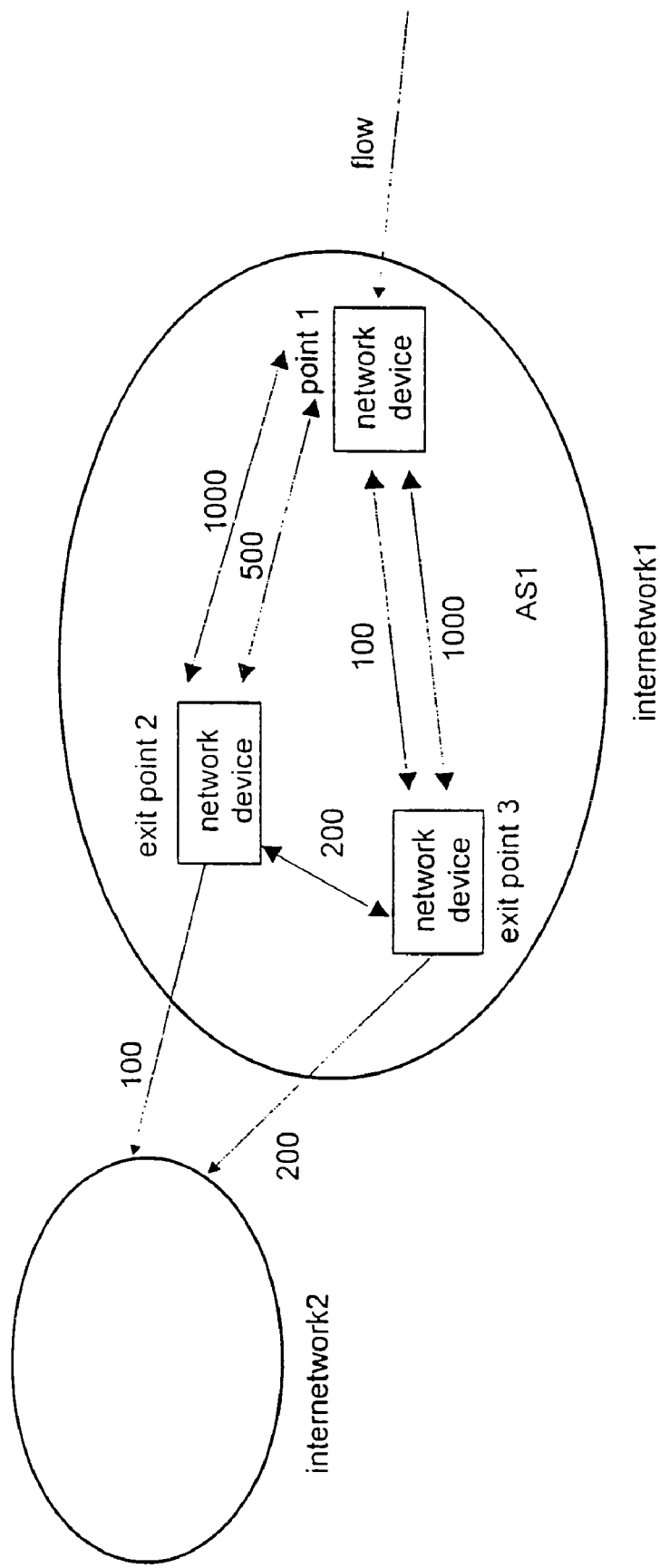
FIG. 2 shows an example of needing to determine an exit point from an internetwork and some ways to compute the exit point.

Relating to an embodiment of FIG. 2 suppose we have a flow at point 1 trying to reach internetwork2, and the paths have the metrics associated with them as annotated, where lower is better and metrics can be added together. Some possibilities for determining the exit point and path to the exit point include (but are not limited to): choose the exit point first and then determine path to the exit point. In this case, choose exit point 2 as the best exit point because its path to internetwork2 has metric 100 and exit point 3 has metric 200. Given that we have chosen exit point 2, we can choose either the best direct path from point 1 to exit point 2 (500) or the best indirect path (in this case, via exit point 3, 100+200). This is results in a total path metric of 100+200+100=400. Consider both the exit point's paths and the paths to the exit point in combination. In this case, choose exit point 3, because even though the path to internetwork2 from exit point 3 is 200, the path to exit point 3 from point 1 is only 100. resulting in a total path metric of 100+200=300.

Figure 3:
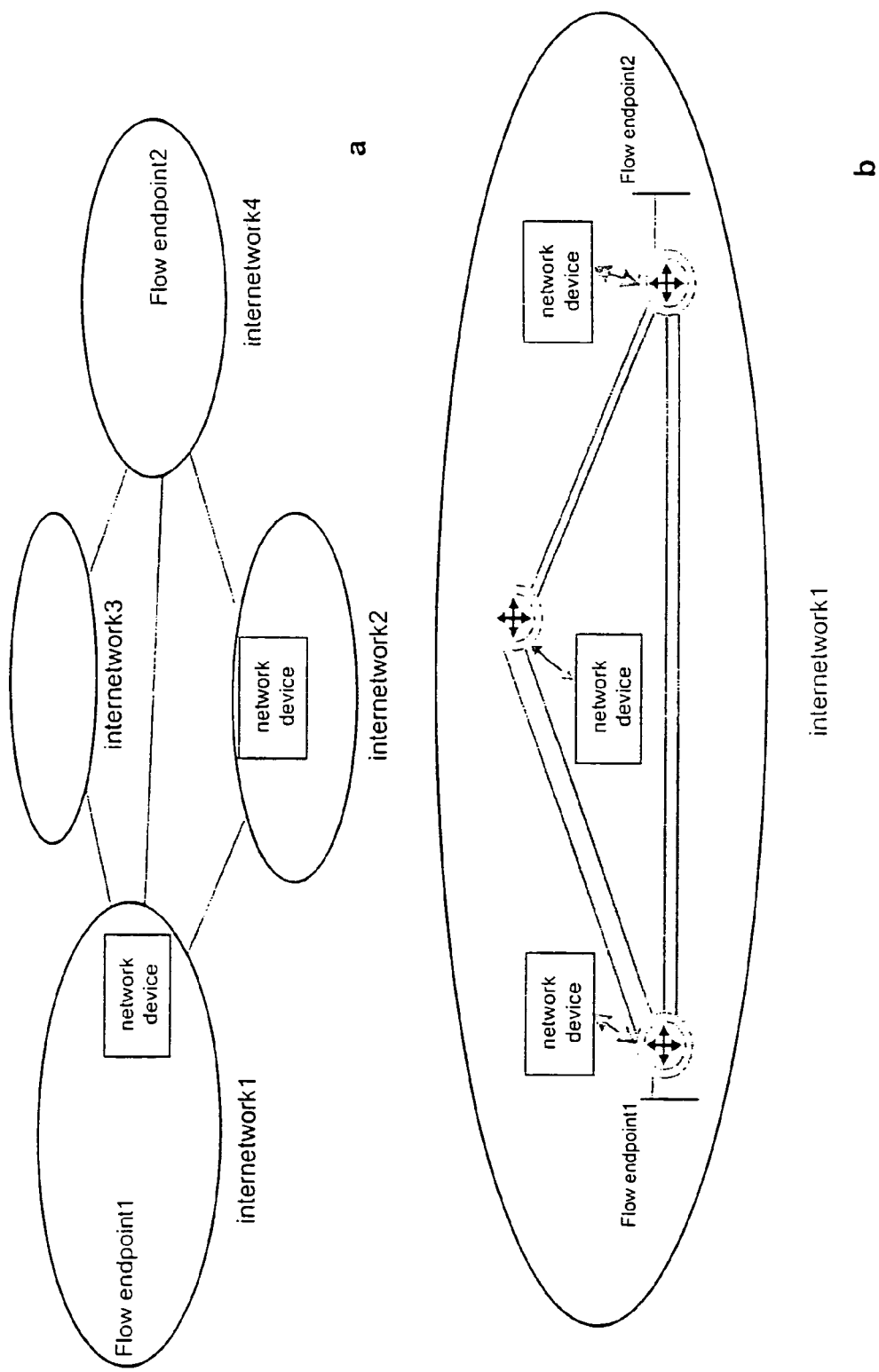
FIG. 3 shows examples showing network devices affecting routing across multiple internetworks and affecting routing inside a single internetwork.
Figure 4:
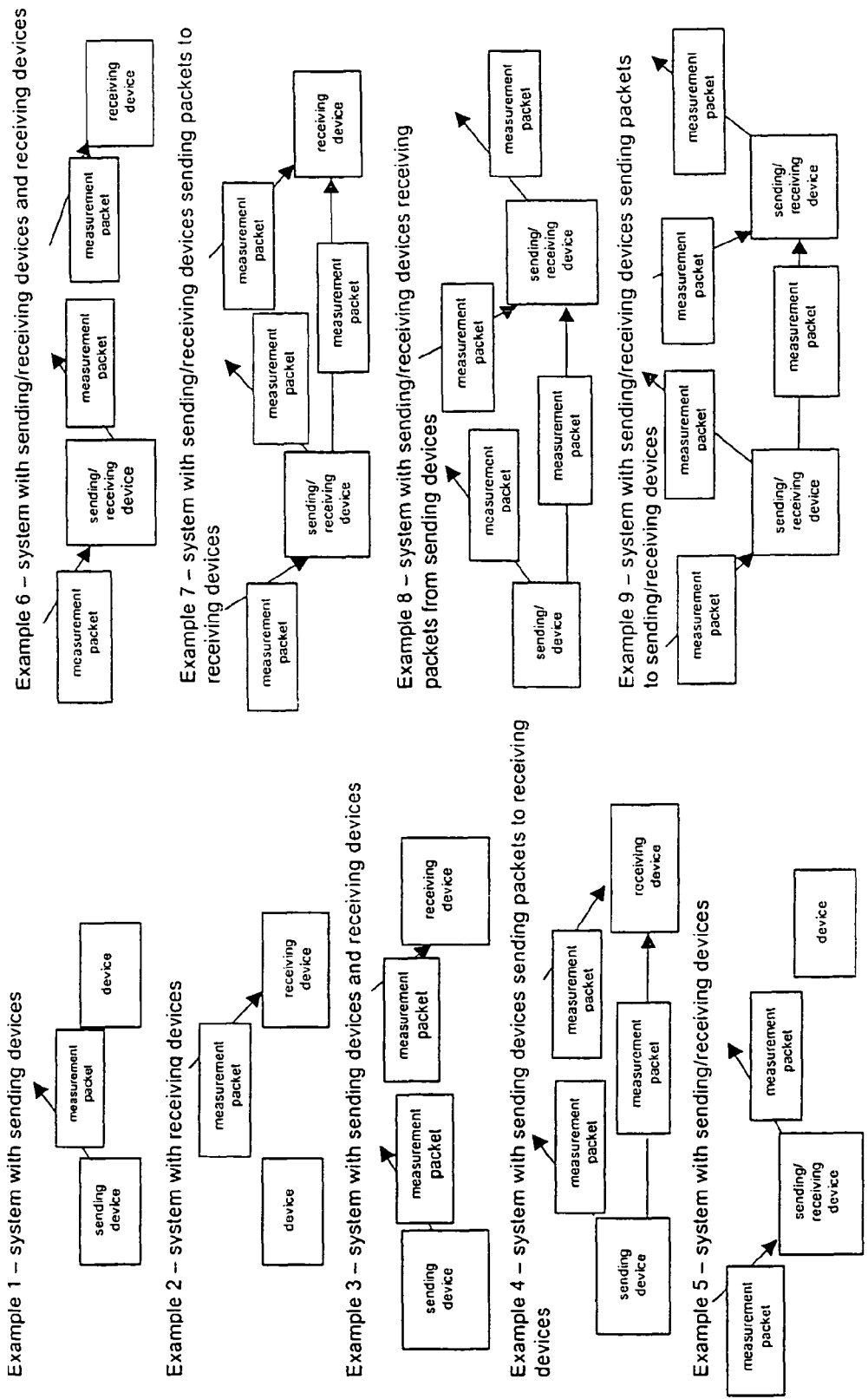
FIG. 4 shows some possible embodiments of devices that are communicating with each other, for example sending and receiving measurement packets.
Figure 5:
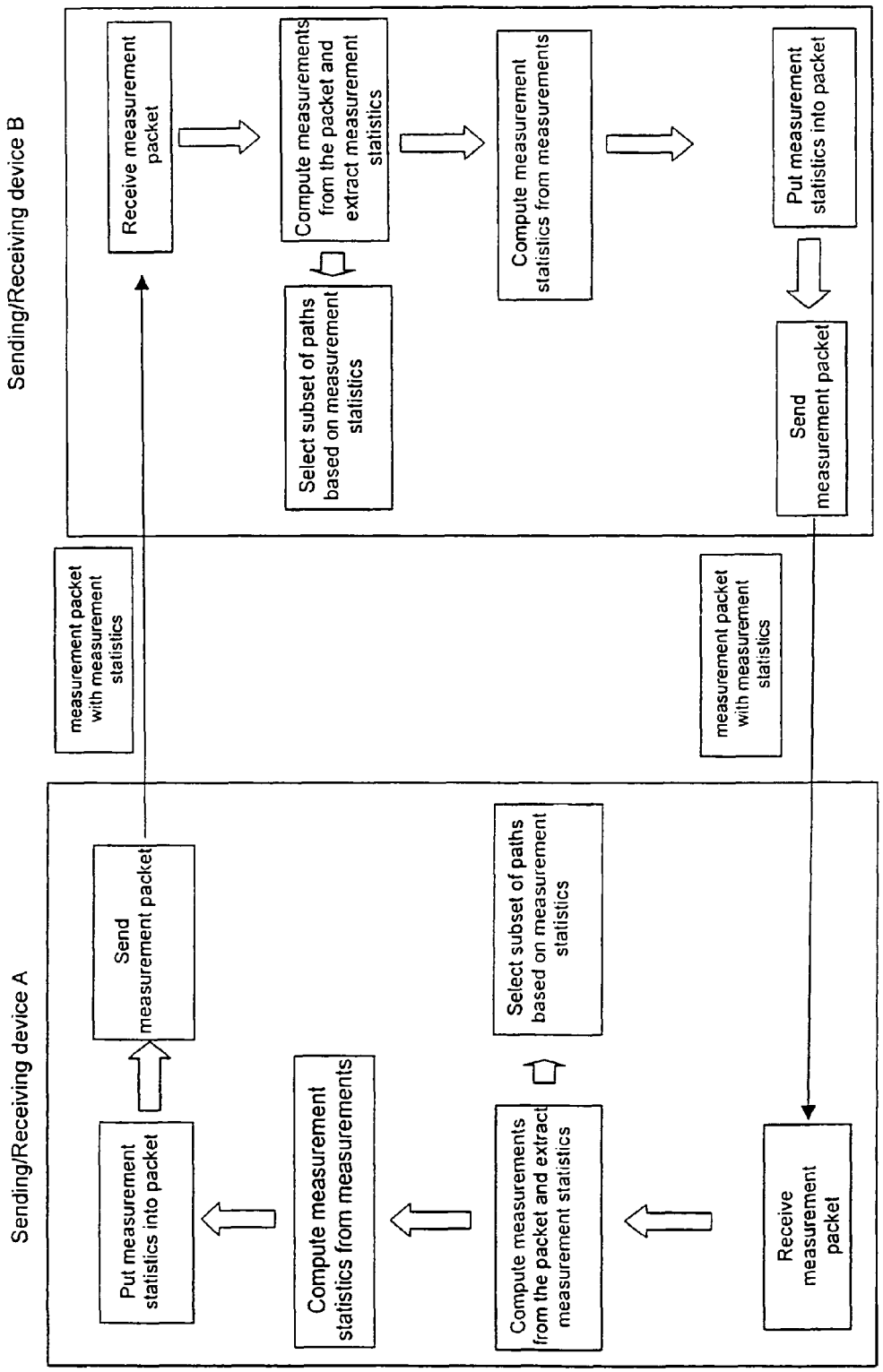
FIG. 5 shows one specific detailed embodiment of two devices, where each device is sending and receiving measurement packets as well as selecting a subset of paths.
Figure 6:
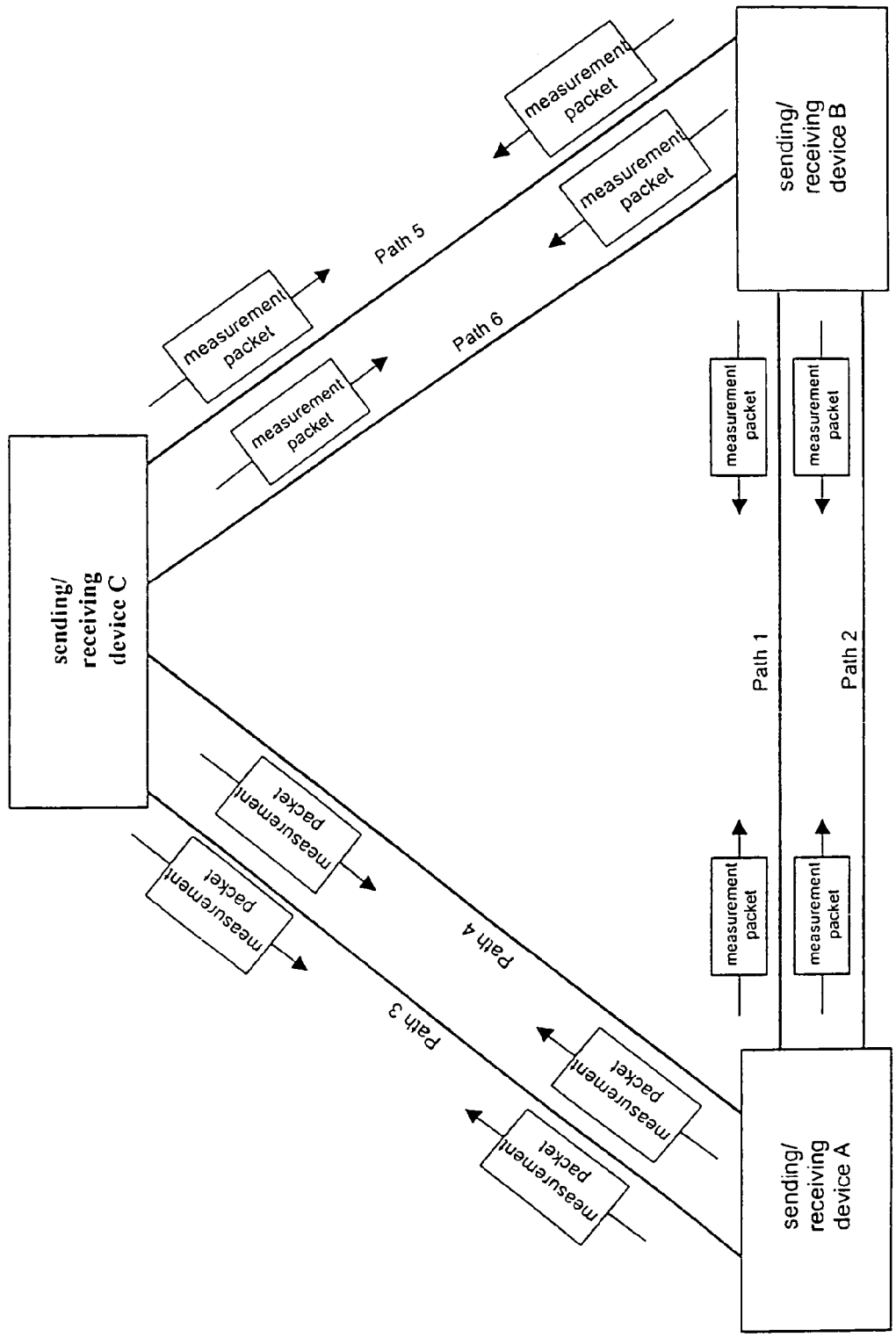
FIG. 6 shows an embodiment with more than two devices that are sending and receiving measurement packets to obtain measurements of performance characteristics of paths and to communicate measurements statistics about those paths.

Relating to one embodiment, FIG. 3a shows an internetwork1 with a network device can decide to redirect flows directly bound for internetwork 4 to another internetwork with a network device, like internetwork 2, or to an internetwork without a network device, like internetwork 3.

Relating to one embodiment, FIG. 3b shows an internetwork1 can have both flow endpoints inside of it, and can have multiple network devices deployed to obtain measurements, calculate metrics, select paths, and alter routing in the internetwork.

Measurement Packets

A measurement packet is a packet sent by a sender over an internetwork that includes information necessary for the receiver of the packet to compute measurements of the performance characteristics of the path the packet has traversed over that internetwork. The information includes information for a receiver of the measurement packet to compute measurements of performance characteristics of at least a portion of the path of the measurement packet; and data including one or more of measurement statistics, a generic communication channel, network information, and control data directing a receiver of the measurement packet to change one or more configuration parameters of the receiver.

In some embodiments of the invention, the information included in the measurement packet to compute measurements includes at least one of a timestamp of a sending time of the packet and a number to identify the packet by itself and to identify the relative position of the measurement packet in a sequence of measurement packets, In some embodiments of the invention, the measurement packet is implemented using the following data structure:

```
struct MeasurementHeader {
    /**
     * A generation number. This value represents when the
     * sender began sending. This value is a standard Unix
     * timestamp that seconds since Jan 1, 1970 UTC.
     **/
    uint32_t mGeneration;
    /**
     * A sequence number for the packet. This increments each
     * time a packet is sent and rolls over when 16 bits is
     * exceeded.
     **/
    uint16_t mSequence;
    /**
     * The IP address the packet is sent to.
     **/
    uint32_t mDstAddr;
    /**
     * The send timestamp for this packet.
     **/
    uint64_t mSendTime;
};
```

The mGeneration field is used to detect when a sending process has started a new session. This field is used by the receiver to determine that a discontinuity in the stream's sequence numbers is the result of a sender restart, rather than due to large network latencies, duplicate packets or dropped packets.

The sequence number mSequence field is incremented by one each time a packet is sent. This approach allows the receiver to deduce lost and duplicate packets by identifying missing and duplicate sequence numbers.

The mSendTime field contains the time at which the packet was sent, represented as microseconds since Jan. 1, 1970 UTC. This field is compared to the time the packet arrived at the receiver to determine the delay between the sender and the receiver.

In some embodiments of the invention, a plurality of one or more packets are sent over a path continuously. In some embodiments of the invention, the continuous stream of packet is denoted as a measurement stream. Each measurement stream is uniquely identified by the source and destination IP addresses. The sender maintains one socket descriptor for each source IP address it sends from and writes the destination IP address into the mDstAddr field. On the receiver side, the source IP address is returned by the recv( ) system call and the destination address is retrieved from the measurement packet.

Data Included in the Measurement Packets

In measurement packets that contain sufficient space, data will be included, including one or more of measurement statistics, a generic communication channel, network information, and control data directing a receiver of the measurement packet to change one or more configuration parameters of the receiver.

Some embodiments of the invention will add a single type of data to each packet. Some embodiments of the invention will use a complex data, including subpackets.

Some embodiments of the invention use subpackets that include a single byte subpacket type identifier, followed by a 2-byte length field (including the length of the type and length fields) and finally including the data that is to be sent. One embodiment will store all values in network byte order. Other byte orders will be apparent to those skilled in the art. The following data structure definition describes some embodiments.

```
class SubPacket {
    /*
     * The type identifier for this subpacket.
     */
```

-continued

```
    uint8_t mType;
    /*
    * The length of this subpacket, in network byte order.
    */
    uint16_t mLength;
};
```

One embodiment of this invention will include data describing a momentary snapshot of the measurement statistics for a given path between a sender and a receiver.

In some embodiments of this invention, this data will include one or more of the following information: the source and destination IP addresses that define the path, a measurement packet size for which the statistics have been calculated as well as computed measurement statistics that are at least partly responsive to delay; computed measurement statistics that are at least partly responsive to jitter and computed measurement statistics that are at least partly responsive to packet loss.

In one embodiment of this invention, these statistics will be in units of microseconds expressed as 64-bit floating-point quantities and transmitted in a standard network byte order.

In one embodiment of this inventions the following data structure will store the computed statistics:

```
class TunnelStatsSubPacket : public SubPacket {
    /**
    * The time that this statistic snapshot was taken (in
    * microseconds since 1970).
    **/
    uint64_t mTimestamp;
    /**
    * The source IP address of the tunnel these statistics apply
    * to.
    **/
    uint32_t mSrcAddr;
    /**
    * The destination IP address of the tunnel these statistics
    * apply to.
    **/
    uint32_t mDstAddr;
    /**
    * The size of measurement packet that these statistics apply
    * to. A size of 0 indicates that these statistics apply to
    * all packet sizes.
    **/
    uint16_t mPktSize;
    /**
    * The average delay in microseconds.
    **/
    double mDelay;
    /**
    * The average jitter in microseconds.
    **/
    double mJitter;
    /**
    * The percentage of packets that have been lost, in the range
    * 0 to 1.
    **/
    double mLoss;
};
```

Some embodiments of this invention include the time at which the statistics were computed such that those statistics are sent over multiple paths for improved reliability and to take advantage of one path having less delay than another. One embodiment at the receiving end is able to compare the computation times of received statistics to place them in their original temporal order, regardless of their relative arrival times over the paths.

Some embodiments of this invention will send computed statistics specific to the paths that are part of the plurality of one or more paths that are between the specific sender and receiver. Other embodiments will send additional computed statistics for paths that are not one of the plurality of one or more paths that are between the specific sender and receiver.

Some embodiments of this invention will include network information concerning network topology including but not limited to information retrieved from routers such as in-bound or out-bound link utilization, inbound or out-bound link bandwidth and/or CPU utilization. Other network information determined from routers and other network devices will be apparent to someone skilled in the art.

Some embodiments of this invention will also include control data directing a receiver of the measurement packet to change one or more configuration parameters of the receiver.

In some embodiments of the invention, the control data will instruct a receiver to alter its configuration, including but not limited to zero or more of the following examples: instructing a receiver to initiate sending a plurality of one or more measurement packets, change one or more of the measurement packet sizes, inter-measurement packet transmission times and mix of packet sizes, and stop sending one or more of the plurality of measurement packets.

In some embodiments of the invention, this control information will include notification of measurement devices that have joined or left the network.

In many embodiments of the invention, the measurement packets will be encrypted by the sender and decrypted by the receiver. Some of these embodiments will use IPSec.

In some embodiments of the invention, the encryption and decryption will be done by an external device using IPSec.

Other encryption and decryption options will be apparent to one skilled in the art.

In some embodiments of the invention, the measurement packets will be digitally signed.

In some embodiments of the invention, a generic communication channel will be used by a sender and a receiver to communicate data between them.

Performance Characteristics of a Path

Measurements are used to compute performance characteristics of the paths traversed by the measurement packets. The measurements can either be computed from the measurement packets themselves, or extracted from the arbitrary data carried by the measurement packets. The measurements of performance characteristics include at least one or more of one-way measurements and round-trip measurements. The performance characteristics include at least one or more reachability, delay, jitter, loss, available bandwidth. and total bandwidth. Other performance characteristics will be apparent to those skilled in the art.

In some embodiments of the invention, delay measurements are computed as the interval of time from the moment the measurement packet is sent by the sender to the moment of time the measurement packet is received by the receiver. The sending time is carried by the packet, and it is measured by the clock the sender refers to. The receiving time is measured by a clock that the receiver refers to, which may or may not be synchronized with the sender's clock.

In some embodiments of the invention, the clock of the sender and the clock of the receiver are synchronized. A plurality of one or more precise clock inputs such as GPS, NTP, IRIG and NIST will be used. Some embodiments of this invention will use the same clock as an input to more than one of the plurality of one or more senders and receivers. In some embodiments of the invention, the clock of the sender and the clock of the receiver are the same.

In some embodiments of the invention, the clock of the sender and the clock of the receiver are not synchronized, and mechanisms based on the measurement data are used to correct the clock skew and clock drift, the mechanisms including using minimum delay across multiple measurement samples, and using a mechanism to track the minimum delay over time.

Some embodiments of the invention will use the minimum round-trip delay between the devices to place a lower bound on clock skew.

Some embodiments of the invention will use the lower bound of multiple paths between the sender and receiver to further reduce the lower bound.

Some embodiments of the invention will correct for clock drift by tracking the relative clock skew between the sender and receiver over time and adjusting for the slope of the drift.

In some embodiments of the invention, jitter measurements, also known as inter-measurement packet delay variations, are computed as the difference in delay on consecutive, successfully received packets.

In some embodiments of the invention, jitter can also be computed as the difference between the instantaneous delay of a packet, and the average delay of all the measurement packets previously received.

In some embodiments of the invention, loss measurements are computed by assigning a timeout value to each measurement packet that indicates the instant of time after which the measurement packet will be declared lost, if the packet has not arrived by that time. In some embodiments of the invention, the timeout value of a measurement packet can be computed with the transmission time of a previously received packet, an estimation of the inter-transmission time between measurement packet, and an estimation of the transmission delay of the measurement packet. In some embodiments of the invention, the inter-transmission time can be estimated if the receiver knows about the scheduling pattern of transmission of measurement packets. In some embodiments of the invention, the transmission delay of packet can be estimated based on delay and jitter performance characteristics.

Performance characteristics of a path could be the measurement themselves, or statistics on those measurements. In the statistics case, a dynamic algorithm is used to updates the statistics associated with a path with every new measurement obtained with the arrival of every new packet over the path.

In some embodiments of the invention, the algorithm computes statistics over the performance characteristics of the path.

In some embodiments of the invention, the statistics include averages, deviations, and variances. Other statistics will be apparent to those skilled in the art. In some embodiments of the invention, averages can be computed using a plurality of one or more techniques including a moving average, an average based on the Robbins-Moro estimator, a window-based average or a bucket-based average. Other techniques to compute averages will be apparent to those skilled in the art.

In some embodiments of the invention, the moving average is an exponentially moving average computed using a Robbins-Moro estimator. The Robbins-Moro stochastic approximation estimator finds a solution of the equation:

$$E[f(t)-x]=0$$

where E is the expectation, f(t) a function and x the estimator. The general form of the solution is:

$$x(t)=x(t-1)+alpha*[f(t)-x(t-1)]=(1-alpha)*x(t-1)+alpha*f(t)$$

or, with alpha=$(1-\mu)$, $$x=\mu*x+(1-\mu)*f$$

$\mu$ is the weight of the estimator, and determines the amount contributed to the average by the function. In some embodiments of the invention, $\mu$ is constant.

In some embodiments of the invention, $\mu$ is a dynamic value, whose value depends on the last value of the function f according to the formula:

$$\mu=e(-f/K)$$

where K is a constant that also determines the importance of the last value of $f$ with respect to the current value of the estimator x.

In some embodiments of the invention, average delay can be computed using an exponentially moving average as follows, $$d=\mu*d+(1-\mu)*m$$

where d is the exponentially moving average of delay, m is the last delay sample, and $\mu$ is the weight of the moving average.

In some embodiments of the invention, average jitter can be computed using an exponentially moving average as follows, $$v=\mu*v+(1-\mu)*|d-m|$$

where v is the exponentially moving average of jitter, |d−m| is the last sample of jitter, and $\mu$ is the weight of the average.

In some embodiments of the invention, average jitter can be computed using an exponentially moving average as follows.

$$v=\mu*v+(1-\mu)*|m-m'|$$

where v is the exponentially moving average of jitter, |m−m'| is the last sample of jitter, m is the last delay sample, m' is the previous delay sample, and $\mu$ is the weight of the average.

In some embodiments of the invention, delay and jitter averages can be combined into a single value as follows:

$$1=d+M*v$$

where d is the average delay, v is the average jitter and M is a constant.

In some embodiments of the invention, average loss can be computed using an exponentially moving average as follows, $$p\text{-}hat=\mu*p\text{-}hat+(1-\mu)*p$$

where p-hat is the moving average of the loss, p={0 if packet is received, 1 is the packet is declared lost}, and $\mu$ is the weight of the exponentially moving average.

In some embodiments of the invention, $\mu$ is determined based on the notion of forgiveness against a single packet loss. The forgiveness period is the interval of time between the time the packet loss occurs and the time the average loss is forgiven. The forgiveness period can be either defined in units of time, or in number of packets if the rate of the monitoring flow is known. That is, the forgiveness period will end after n consecutive packets have been received after the loss, when these packets have been transmitted at a certain rate.

The value of the exponentially moving average after receiving the n packets is needed before $\mu$ can be determined, and this value is known as the forgiveness threshold. In some embodiments of the invention, the forgiveness threshold is chosen arbitrarily. In some embodiments of the invention, the forgiveness threshold takes the value:

$$\tfrac{1}{2}(1-\mu)$$

This value is half of the value of the estimator after the singe loss occurs, and thus we call it the half-life threshold. Similarly, we also call the forgiveness period under this threshold the half-life period. The advantage of using a forgiveness threshold greater than zero is that issues related to host-dependent floating-point representations reaching that value are avoided.

In some embodiments of the invention, μ is computed by comparing the value of the estimator after n consecutive packet arrivals since the loss with the half-life threshold:

$$\hat{p} = (1-\mu) * \mu^n < \frac{1}{2}(1-\mu)$$

Given that n is known because is determined by the value of the half-life period and the transmission rate, μ is computed as:

$$\mu = \exp((\ln \tfrac{1}{2})/n)$$

In some embodiments of the invention, two thresholds are defined, an upper threshold and a lower threshold. When the value of p-hat exceeds the upper threshold, the loss is not forgiven until enough measurement packets are received consecutively so that the value of p-hat gets below the lower threshold.

Other mechanisms to compute μ will be apparent to for those skilled in the art.

Path Description

In some embodiments of the invention, the path traversed by the measurement packets from the sender to the receiver is such that the path is at least partly implemented with at least one of a GRE tunnel, an IPSEC tunnel and IPonIP tunnel. Other path implementations using tunnel will be apparent for those skilled in the art.

In some embodiments of the invention, the path traversed by the measurement packets from the sender to the receiver is implemented with a virtual circuit, including a frame relay PVC, an ATM PVC or MPLS. Other path implementations using virtual circuits will be apparent for those skilled in the art.

Other path implementations will be apparent to those skilled in the art.

Internetwork Description

In some embodiments of the invention, the internetwork is implemented by a plurality of one or more subnetworks, including a plurality of one or more VPNs, a plurality of one or more BGP autonomous systems, a plurality of one or more local area networks, a plurality of one or metropolitan area networks, and a plurality of one or more wide area networks.

In some embodiments of the invention, the internetwork is implemented by an overlay network.

Other internetwork implementations will be apparent to those skilled in the art.

Packet Sizes and Transmission Times

In some embodiments of the invention, the measurement packets are of varying sizes, including 64, 256, 512, 1024, 1500 bytes.

In some embodiments of the invention, the size of the measurement packets is specified with an external API.

In some embodiments of the invention, the measurement packets are of a fixed size.

In some embodiments of the invention, the measurement packet sizes and times between measurement packets simulate the traffic pattern of a plurality of one or more applications In some embodiments of the invention, traffic patterns correspond to voice applications, where the packets re of small size, e.g., 30 bytes, and the inter-transmission time between consecutive packets is constant, e.g., 10 ms. These examples do not limit the possible size values and inter-transmission time values.

In some embodiments of the invention, traffic patterns correspond to video applications, where the packets size is the largest permitted to be transmitted by an internetwork without being fragmented, and the inter-transmission time between consecutive packets varies depending on the spatial and temporal complexity of the video content being transmitted, the compression scheme, the encoding control scheme.

In some embodiments of the invention, traffic patterns correspond to the plurality of applications observed in an internetwork, including at least one or more of HTTP transactions, FTP downloads, IRC communications, NNTP exchanges, streaming video sessions, VoIP sessions, video-conferencing sessions and e-commerce transactions. Other types of applications will be apparent to those skilled in the art.

In some embodiments of the invention, the inter-measurement packet transmission times are of varying length.

In some embodiments of the invention, the inter-measurement packet transmission times are of fixed length.

In some embodiments of the invention, the inter-measurement packet transmission times specified with an external API.

In some embodiments of the invention, the length of the inter-measurement packet transmission times is randomized according to a distribution. In some embodiments of the invention, this distribution is based at least in part on a uniform distribution. In some embodiments of the invention, this distribution is based at least in part on an exponential distribution. In some embodiments of the invention, this distribution is based at least in part on a geometric distribution. Other distributions will be apparent to those skilled in the art.

In some embodiments of the invention, the length of the inter-measurement packet transmission times is provided by a table.

In some embodiments of the invention, the length of the inter-measurement packet transmission times is controlled by a scheduler. In some embodiments of the invention, the scheduler uses a priority queue, keyed on desired send time.

Other mechanisms to specify the inter-measurement packet transmission time will be apparent to those skilled in the art.

Other packet sizes and transmission times will be apparent to those skilled in the art.

Path Selection

It is possible that multiple alternative paths between a sender and a receiver are available through an internetwork at any given moment. Performance characteristics of each of these paths can be used to select a subset of the paths.

In some embodiments of the invention, the subset of the plurality of paths is selected based at least in part on at least one of: one or more of the measurement statistics from the measurement packet and one or more of the computed statistics.

In some embodiments of the invention, the selection of the subset of the plurality of paths is based at least partly on the position of paths in a ranking. In some embodiments of the invention, the ranking is at least partly based on one or more of the measurement statistics included as data in the measurement packet. In some embodiments of the invention the ranking is at least partly based on the computed statistics of the path. In some embodiments of the invention the ranking is implemented by using a comparison function to compare the paths, and by ordering the paths in a decreasing order. In some embodiments of the invention the ranking is implemented by using a comparison function to compare the paths, and by ordering the paths in an increasing order. Other ranking techniques will be apparent to those skilled in the art.

In some embodiments of the invention, the ranking is based on a single score associated to each path. In some embodiments of the invention, this score is denoted Magic Score (MS), and it is computed as follows:

$$MS=ML*MF$$

$$ML=d+M*v$$

$$MF=\text{delta}*\hat{p}+1$$

where ML is the Magic Latency, a component of the MS obtained using delay and jitter respectively calculated with statistics; and MF is the Magic scaling Factor that multiplies the value of ML, and is computed based on loss statistics. M is a constant that takes several values, including 4, for example. MS can be seen as a scaled-up version of ML, and the scaling factor MF is a function of p-hat and delta, a constant. As p-hat not only reflects loss but also detects large delay spikes before they happen, p-hat can be seen as an indicator of the departure of the path from a "normal mode" operation, and thus the scaling factor is only applied when there are loss or spikes. The goal of MF is to differentiate between paths that have very similar delay characteristics, but with one having losses and the other not having them.

In some embodiments of the invention, ML is used as a delay indicator, given that jitter is accounted as an increase in delay. In contrast, MS, although a scaled version of ML, cannot be used to indicate delay, except when MF=1 (p-hat=0), which leads to MS=ML. That means the value of MS is useful not by itself but to compare it with the MSs of other tunnels.

In some embodiments of the invention, loss statistics can be used as a discriminator instead of a scaling factor. That is, p-hat can eliminate paths experimenting loss. Then, the remaining paths can be selected using MS=ML.

In some embodiments of the invention, the selection of a subset of paths is based on applying at least one or more thresholds to at least one of more of the statistics.

In some embodiments of the invention, a single threshold is used, and computed as a certain percentage of the highest score of the paths. In some embodiments of the invention, the threshold is determined by subtracting a fixed quantity to the highest score of the paths.

In some embodiments of the invention, the number of paths in the subset of paths is fixed. In some embodiments of the invention, this fixed number of paths N out of M paths is determined such that the probability of having loss in (M–N) paths simultaneously is less than a certain threshold. In some embodiments of the invention, this probability is a binomial, with the assumption that all paths have the same probability of loss.

In some embodiments of the invention, the selection of the subset of the plurality of paths is based at least partly on a probability associated with each path. In some embodiments of the invention, the probability of each path is at least partly based on one or more of the measurement statistics included as data in the measurement packet.

In some embodiments of the invention, the probabilities of each path are equal.

In some embodiments of the invention, the selection of the subset of the plurality of paths is based at least partly on the cost of the path.

In some embodiments of the invention the selection of the subset of the plurality of paths is based at least partly on the amount of bandwidth consumed over a period of time.

Other possibilities to compute path probabilities will be apparent to those skilled in the art.

Other mechanisms to select a subset of the paths will be apparent to those skilled in the art.

The invention claimed is:

1. A method of populating a plurality of one or more groups with a plurality of one or more network addresses, the method comprising:
   selecting a plurality of one or more metrics, the plurality of the one or more metrics including statistical similarity and one or more of path performance, network cost, network usage, geographical proximity, and topological proximity;
   creating the plurality of one or more groups in one or more network devices, the network devices including one or more of servers, forwarding devices, and routing devices;
   populating each of the plurality of one or more groups with a subset of the plurality of one or more network addresses based on at least a classification function, the classification function at least partly determined by the selected plurality of one or more metrics; and
   including one or more network addresses from one or more groups of the plurality of one or more groups in a plurality of one or more routing tables distributed across the internetwork;
   wherein the at least the classification function includes a plurality of one or more criteria, the plurality of one or more criteria including topological proximity and administrative policy, wherein the topological proximity includes one or more of adjacency and dependency, and the administrative policy includes one or more of address aggregation and user-defined policy.

2. The method of claim 1, wherein at least path performance is selected.

3. The method of claim 1, wherein at least network cost is selected.

4. The method of claim 1, wherein at least network usage is selected.

5. The method of claim 1, wherein at least geographical proximity is selected.

6. The method of claim 1, wherein at least topological proximity is selected.

7. The method of claim 1, wherein the plurality of one or more criteria includes at least topological proximity, wherein the topological proximity includes one or more of adjacency and dependency.

8. The method of claim 1, wherein the plurality of one or more criteria includes at least administrative policy, wherein the administrative policy includes one or more of address aggregation and user-defined policy.

9. The method of claim 1, wherein, after the populating, the plurality of one or more groups includes a group, the group including network addresses corresponding to the plurality of one or more metrics having a value in a pre-defined range.

10. The method of claim 1, wherein, after the populating, the plurality of one or more groups includes clusters created by a clustering algorithm applied to at least one of the plurality of one or more metrics.

11. The method of claim 1, wherein the selecting, the creating, and the classifying are performed at a central server in an autonomous system.

12. The method of claim 1: wherein the selecting, the creating, and the classifying are performed at a plurality of one or more distributed servers distributed through a plurality of one or more autonomous systems.

13. The method of claim 1, wherein the selecting, creating, and populating are repeated, at least partly responsive to one or more of: a change in the at least one of the plurality of one or more metrics, an expiration of a time period, and an external input.

14. The method of 13, wherein the selecting, creating, and populating are repeated, at least partly responsive to the change in the at least one of the one or more metrics.

15. The method of 13, wherein the selecting, creating, and populating are repeated, at least partly responsive to the expiration of a time period.

16. The method of 13, wherein the, selecting, creating, and populating are repeated, at least partly responsive to the external input.

17. The method of 13, wherein, prior to the change, a first plurality of one or more groups is populated, and after the change, a second plurality of one or more groups is populated, and the first plurality of one or more groups is at least partly different from the second plurality of one or more groups.

18. The method of claim 1, further comprising:
   prior to populating the plurality of groups, creating a default population for at least one of the plurality of one or more groups, wherein the default population is derived at least partly from an observed routing table.

19. The method of claim 18, wherein the observed routing table is from an autonomous system, such that each of the plurality of network addresses is reachable by the autonomous system.

20. The method of claim 18, wherein the default population is a subset of the observed routing are performed on an existing routing table.

21. The method of 20, wherein after selecting, creating, and populating are performed on the existing routing table, any changes to the existing routing table are limited to combining two or more entries into one group.

22. The method of 20, wherein after selecting, creating, and populating are performed on the existing routing table, changes to the existing routing table include dividing at least one entry into two or more groups.

23. The method of claim 1, further comprising:
   prior to populating the plurality of groups, creating a default population for at least one of the plurality of one or more groups, wherein the default population is derived at least partly from observed network traffic.

24. The method of claim 1, wherein the selecting, creating, and populating are performed in a first autonomous system.

25. The method of claim 24, further comprising:
   prior to populating the plurality of groups, creating a default population for at least one of the plurality of one or more groups, wherein the default population is derived at least partly from an observed routing table.

26. The method of 24, wherein the observed routing table is from the first autonomous system.

27. The method of 24, wherein the observed routing table is from a second autonomous system.

28. The method of claim 1, wherein at least one subset of the plurality of one or more groups includes contiguous addresses.

29. The method of claim 1, wherein at least one subset of the plurality of one or more groups includes at least two discontiguous addresses.

30. The method of claim 1, where the plurality of one or more network addresses includes one or more IP addresses.

31. A network system, comprising:
   a plurality of one or more network devices, the plurality of network devices including one or more of servers, forwarding devices, and routing devices, the plurality of network devices populating a plurality of one or more groups with a plurality of one or more network addresses by performing:
   responsive to 1) selecting a plurality of one or more metrics, the plurality of the one or more metrics including statistical similarity of network addresses and one or more of path performance, network cost, network usage, geographical proximity, and topological proximity, and 2) creating the plurality of one or more groups in one or more network devices, the network devices including one or more of servers, forwarding devices, and routing devices;
   populating each of the plurality of one or more groups with a subset of the plurality of one or more network addresses based on at least a classification function, the classification function at least partly determined by the selected plurality of one or more metrics; and
   including one or more network addresses from one or more groups of the plurality of one or more groups in a plurality of one or more routing tables distributed across the internetwork;
   wherein the at least the classification function includes a plurality of one or more criteria, the plurality of one or more criteria including topological proximity and administrative policy, wherein the topological proximity includes one or more of adjacency and dependency, and the administrative policy includes one or more of address aggregation and user-defined policy.

32. A network system, comprising:
   a plurality of one or more network devices, the plurality of network devices including one or more of servers, forwarding devices, and routing devices, the plurality of network devices populating a plurality of one or more groups with a plurality of one or more network addresses by performing:
   selecting a plurality of one or more metrics, the plurality of the one or more metrics including statistical similarity between network addresses of the one or more networked devices and the plurality of one or more metrics further including one or more of path performance, network cost, network usage, geographical proximity, and topological proximity;
   creating the plurality of one or more groups in one or more network devices, the network devices including one or more of servers, forwarding devices, and routing devices, populating each of the plurality of one or more groups with a subset of the plurality of one or more network addresses based on at least a classification function, the classification function at least partly determined by the selected plurality of one or more metrics; and
   including one or more network addresses from one or more groups of the plurality of one or more groups in a plurality of one or more routing tables distributed across the internetwork;
   wherein the at least the classification function includes a plurality of one or more criteria, the plurality of one or more criteria including topological proximity and administrative policy, wherein the topological proximity includes one or more of adjacency and dependency, and the administrative policy includes one or more of address aggregation and user-defined policy.

33. A network system, comprising:
   a plurality of one or more network devices, the plurality of network devices including one or more of servers, forwarding devices, and routing devices, the plurality of network devices populating a plurality of one or more groups with a plurality of one or more network addresses by performing:
   responsive to selecting a plurality of one or more metrics, the plurality of the one or more metrics comprising pre-existing address range definitions and one or more of path performance, network cost, network usage, geographical proximity, and topological proximity;

creating the plurality of one or more groups in one or more network devices, the network devices including one or more of servers, forwarding devices, and routing devices;

populating each of the plurality of one or more groups with a subset of the plurality of one or more network addresses based on at least a classification function, the classification function at least partly determined by the selected plurality of one or more metrics; and including one or more network addresses from one or more groups of the plurality of one or more groups in a plurality of one or more routing tables distributed across the internetwork;

wherein the at least the classification function includes a plurality of one or more criteria, the plurality of one or more criteria including topological proximity and administrative policy, wherein the topological proximity includes one or more of adjacency and dependency, and the administrative policy includes one or more of address aggregation and user-defined policy.

34. A network system, comprising:

a plurality of one or more network devices, the plurality of network devices including one or more of servers, forwarding devices, and routing devices, the plurality of network devices populating a plurality of one or more groups with a plurality of one or more network addresses by performing:

selecting a plurality of one or more metrics, the plurality of the one or more metrics including statistical similarity and one or more of path performance, network cost, network usage, geographical proximity, and topological proximity;

responsive to creating the plurality of one or more groups in one or more network devices, the network devices including one or more of servers, forwarding devices, and routing devices, populating each of the plurality of one or more groups with a subset of the plurality of one or more network addresses based on at least a classification function, the classification function at least partly determined by the selected plurality of one or more metrics; and including one or more network addresses from one or more groups of the plurality of one or more groups in a plurality of one or more routing tables distributed across the internetwork;

wherein the at least the classification function includes a plurality of one or more criteria, the plurality of one or more criteria including topological proximity and administrative policy, wherein the topological proximity includes one or more of adjacency and dependency, and the administrative policy includes one or more of address aggregation and user-defined policy.

* * * * *